Feb. 23, 1965 O. K. KELLEY ETAL 3,170,534
TRANSMISSION AND SWINGING DRIVE AXLES INCLUDING
TORQUE CONVERTERS
Filed Jan. 7, 1959 19 Sheets-Sheet 1

INVENTORS
Oliver K. Kelley,
BY Kenneth W. Gage, &
Richard W. Craig
Robert B. Gerhardt
ATTORNEY

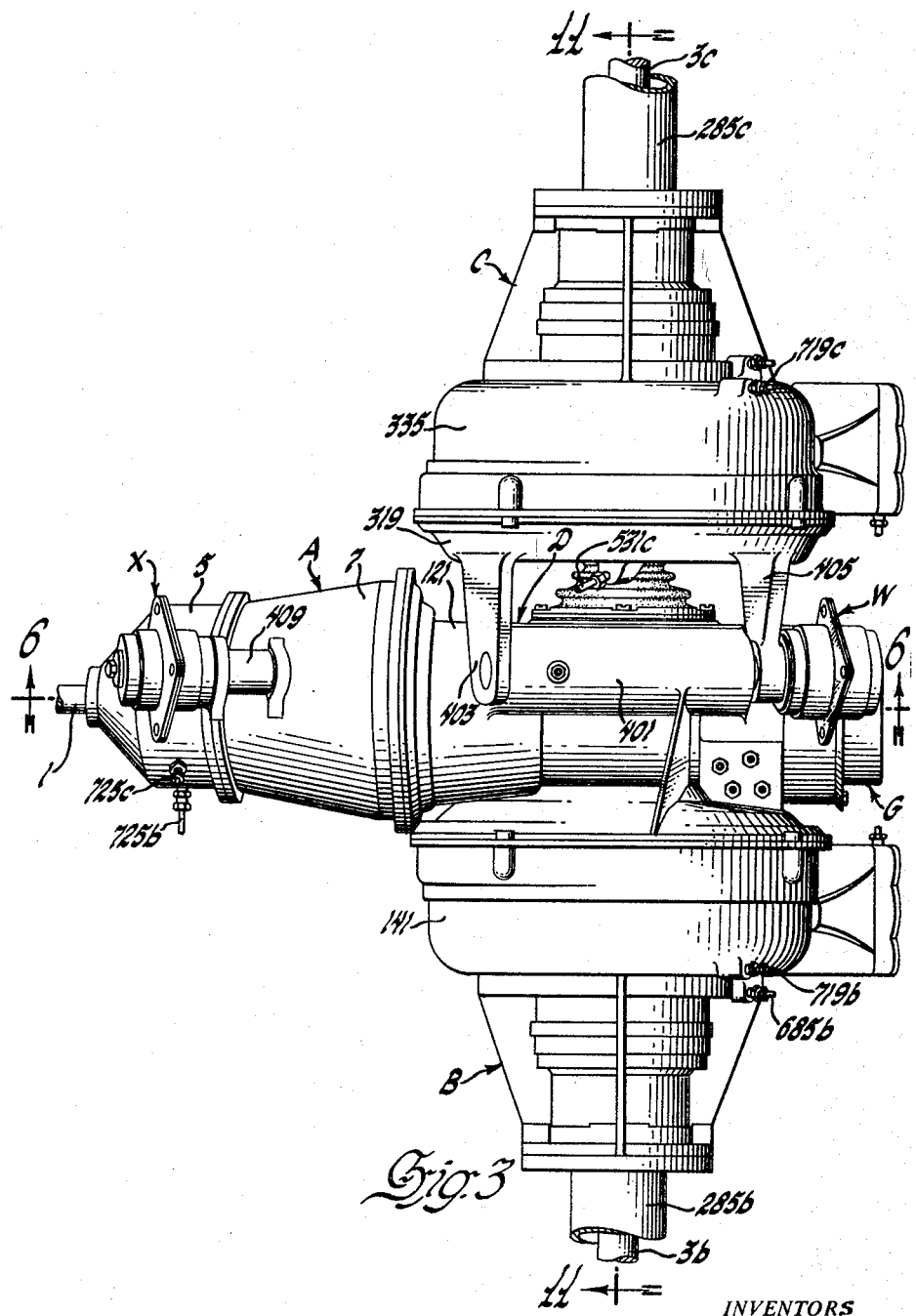

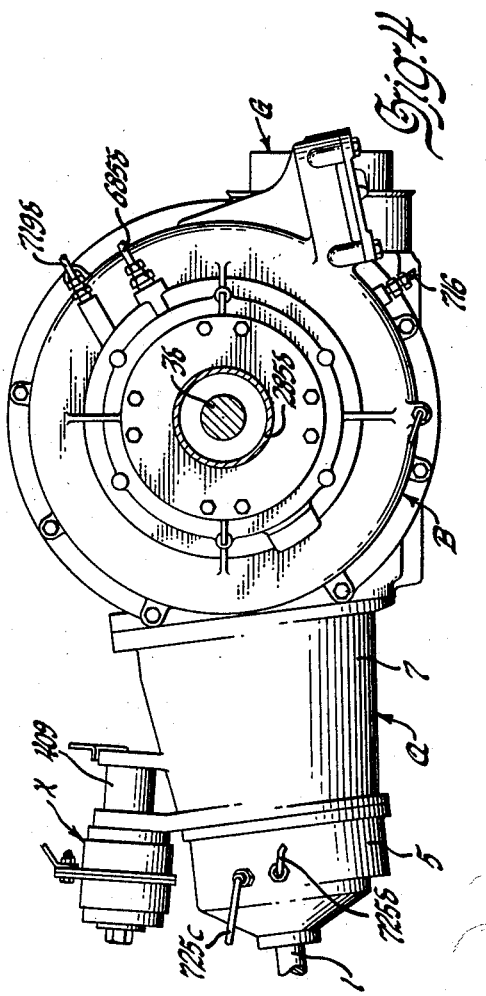
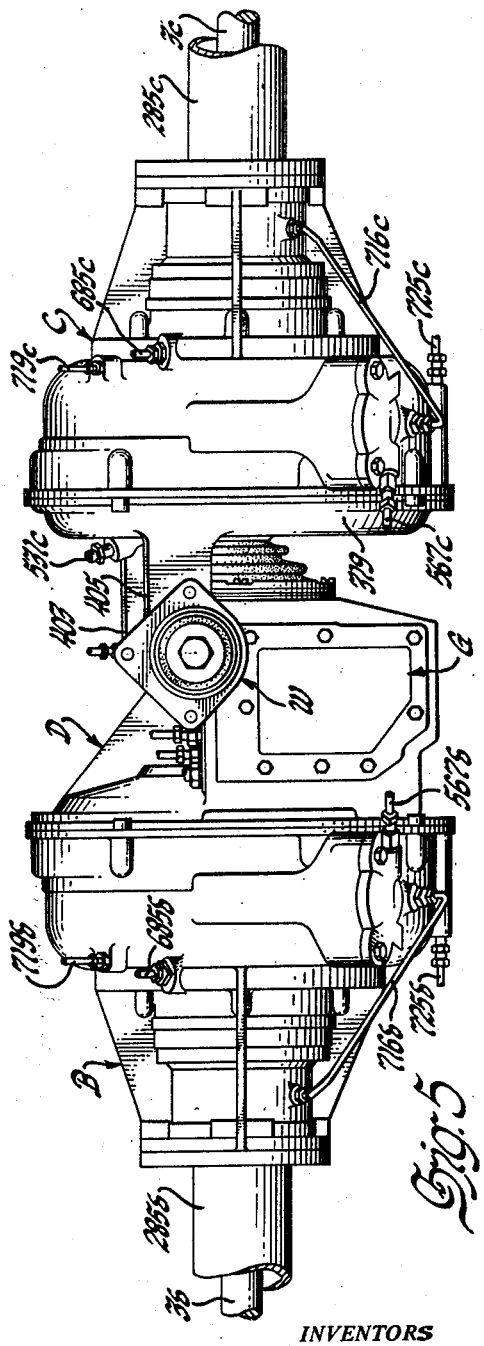

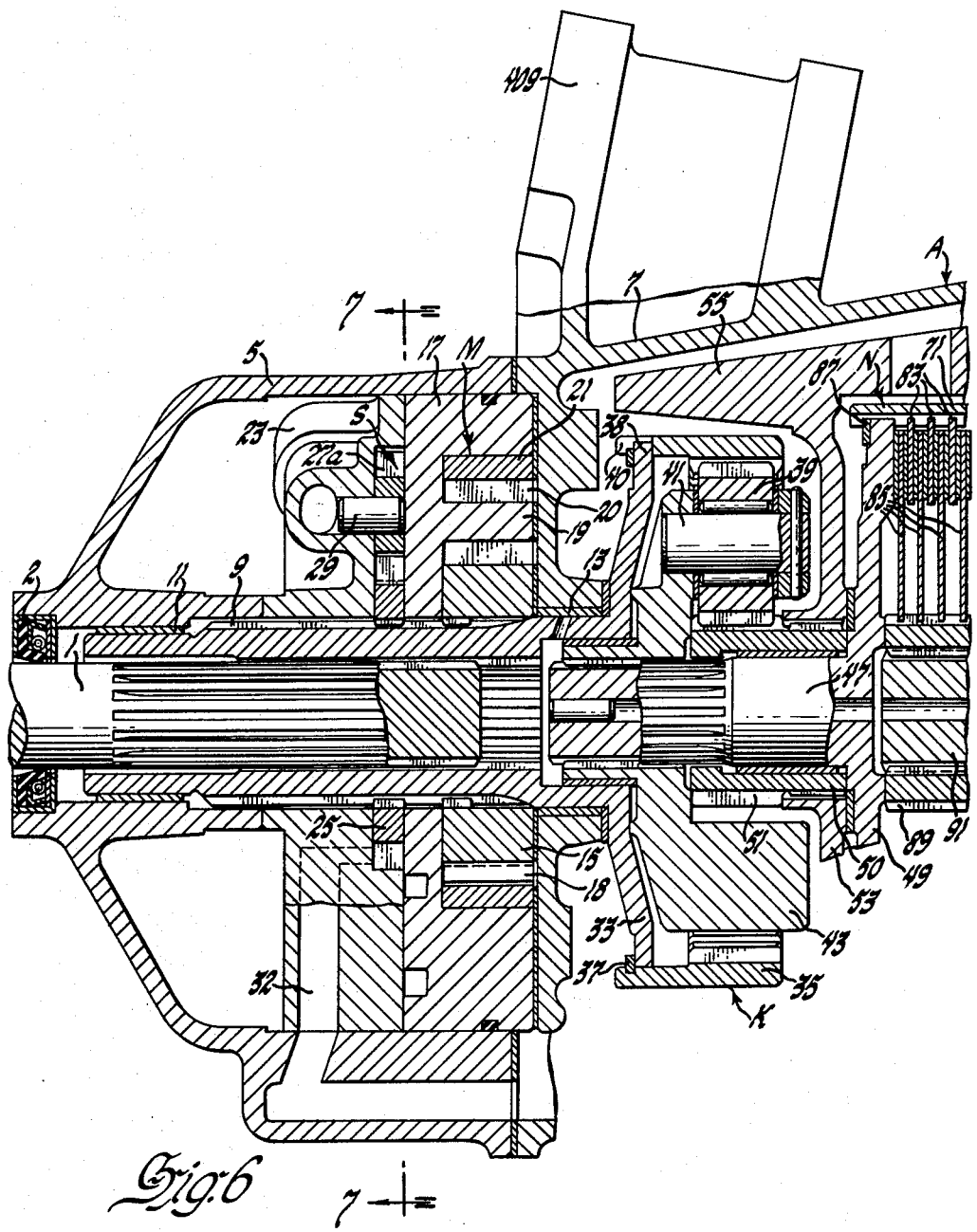

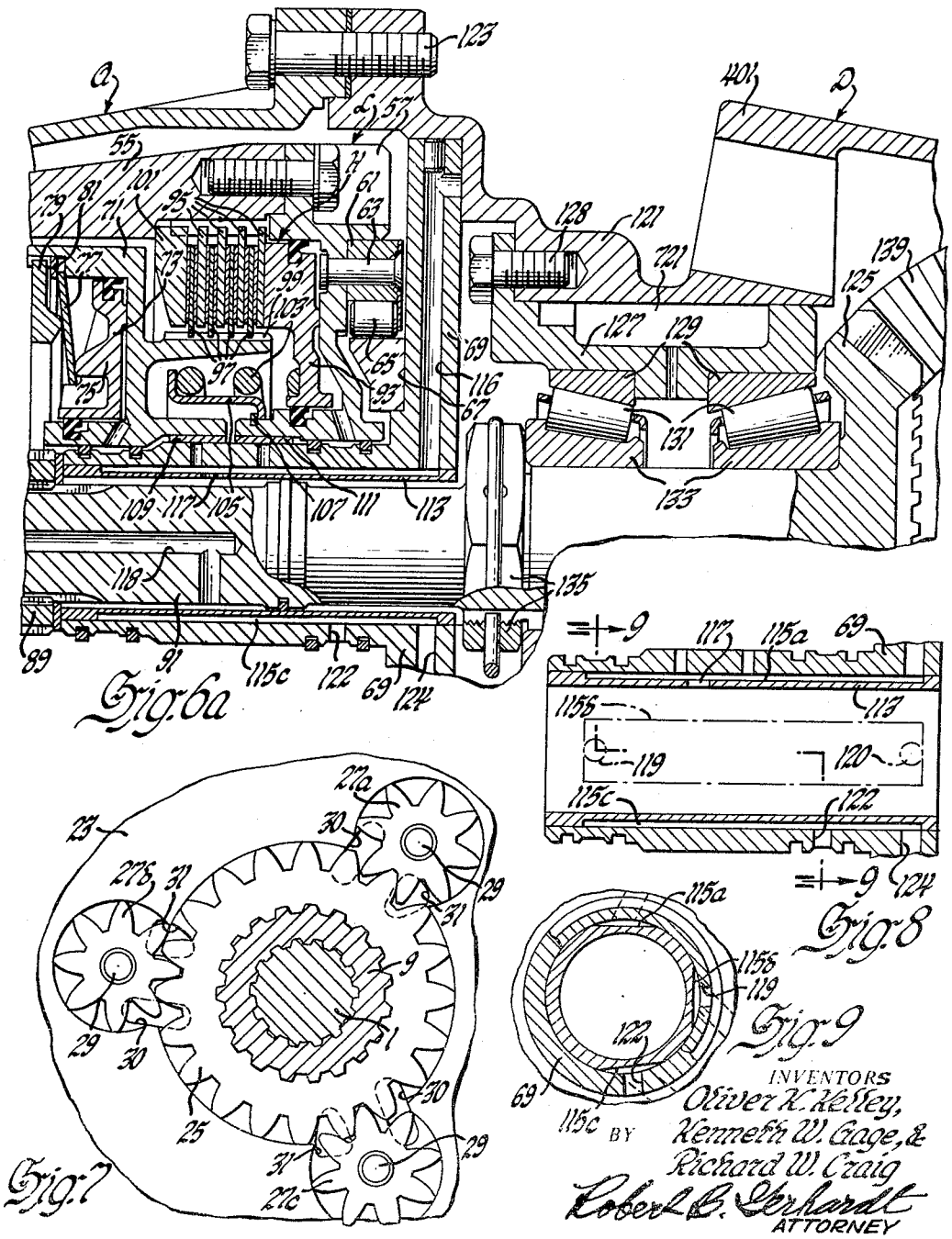

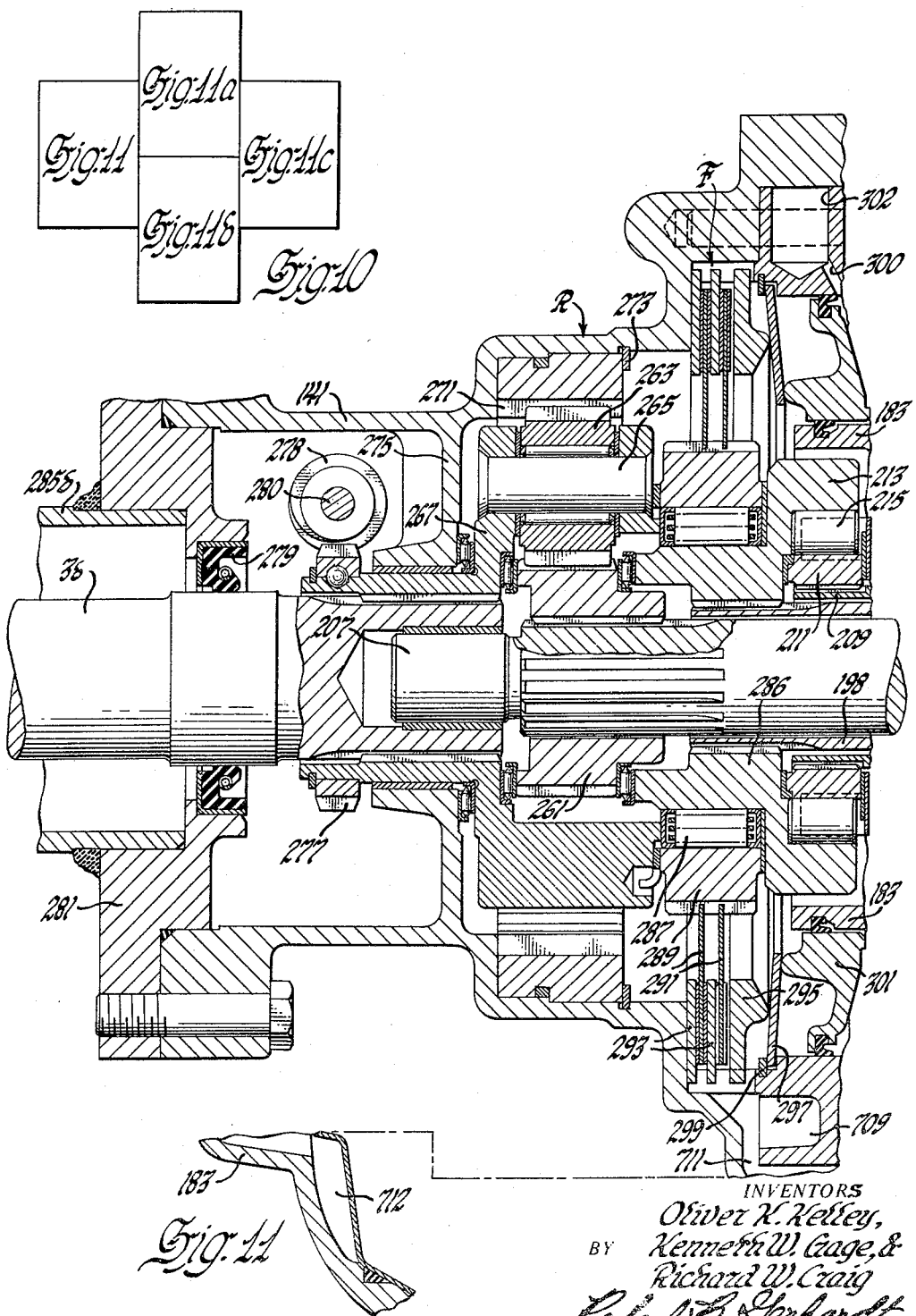

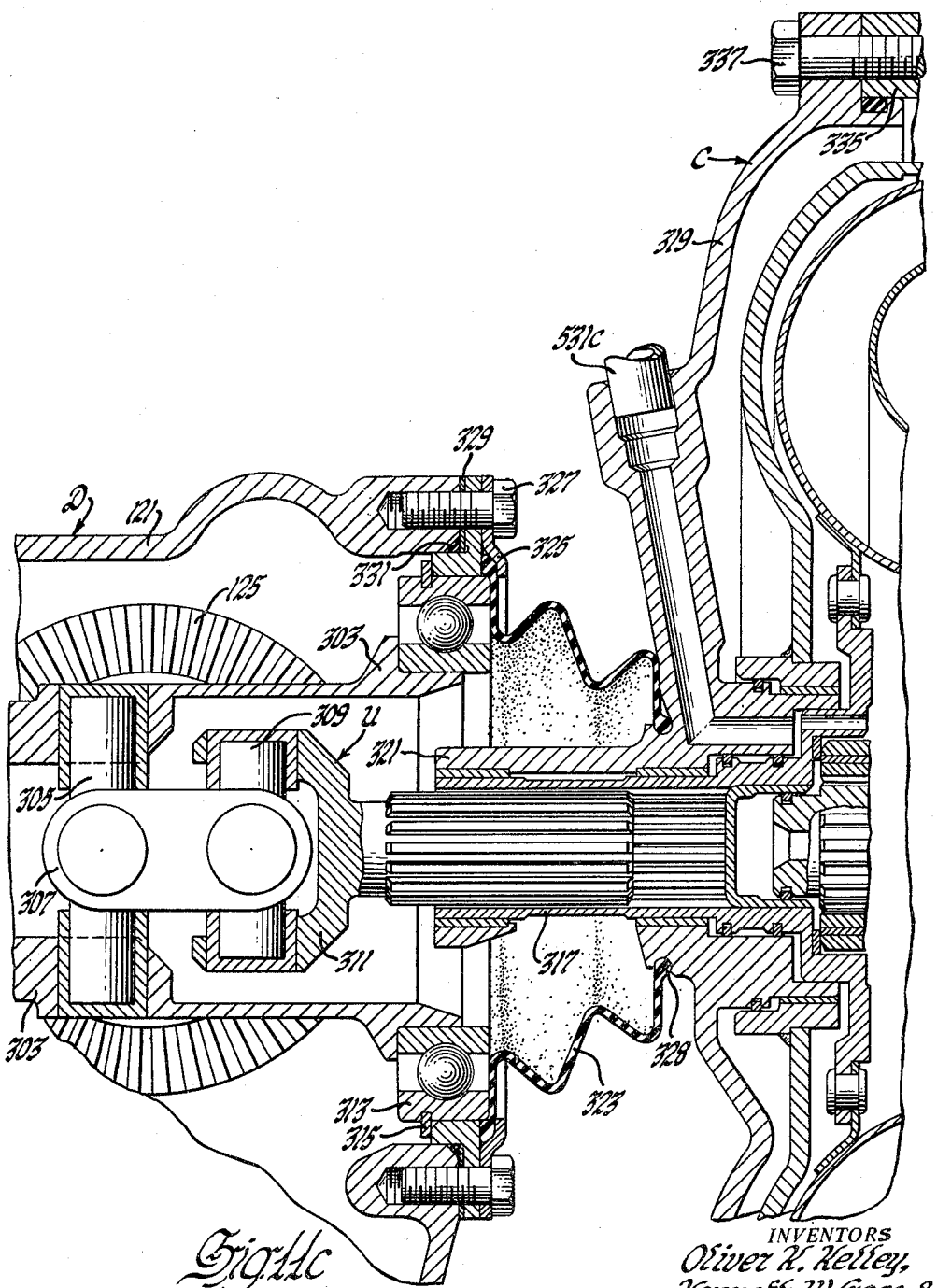

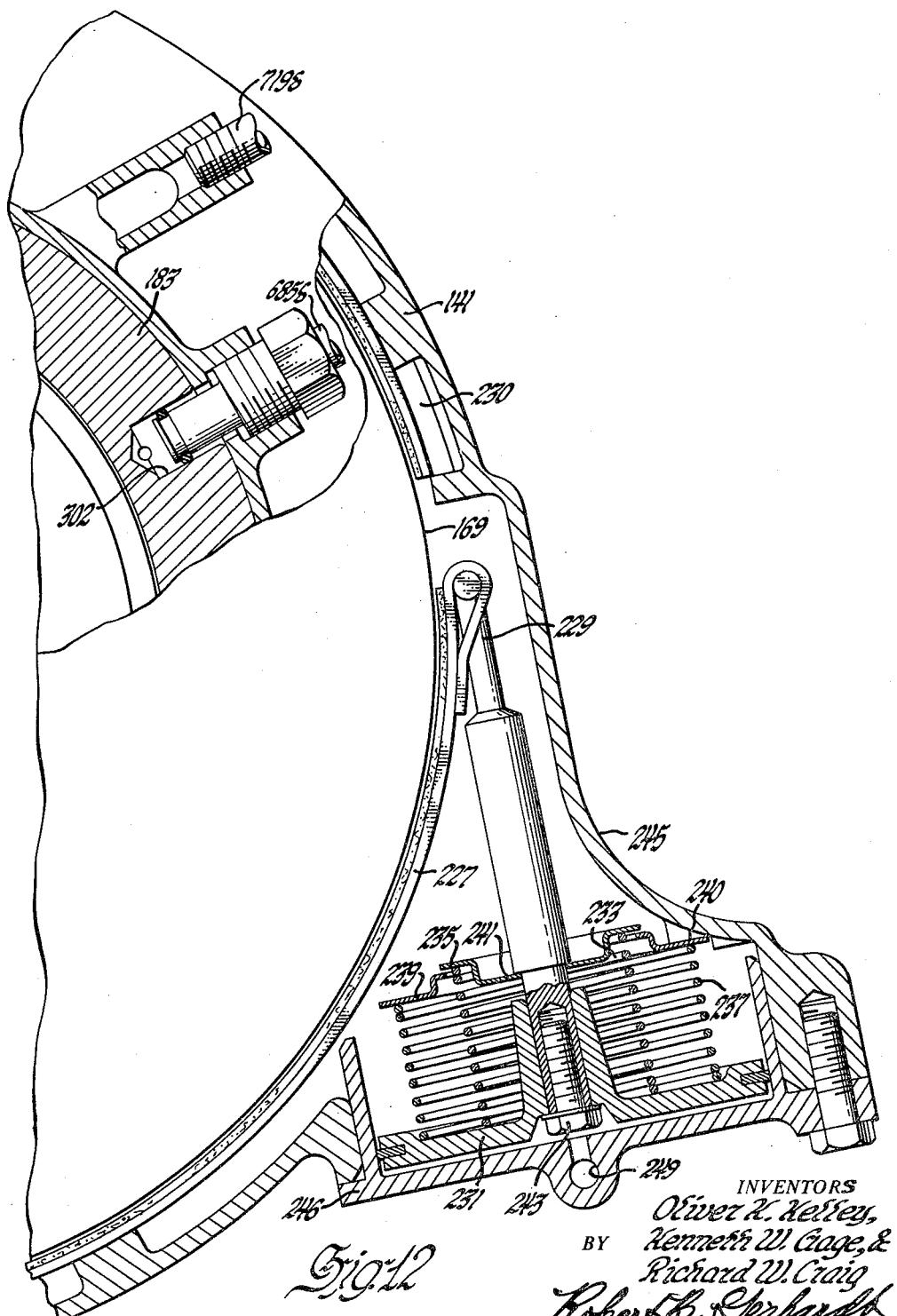

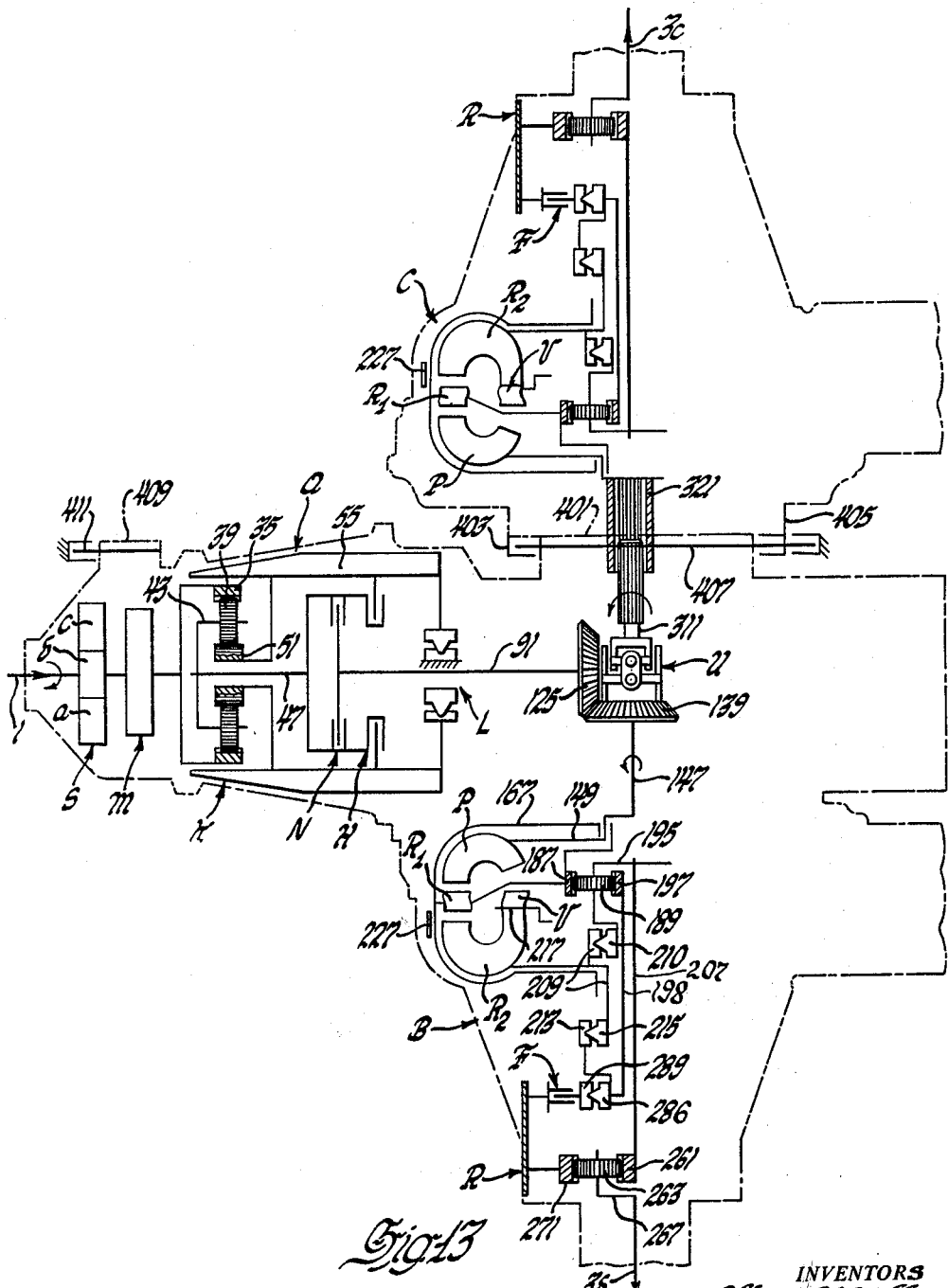

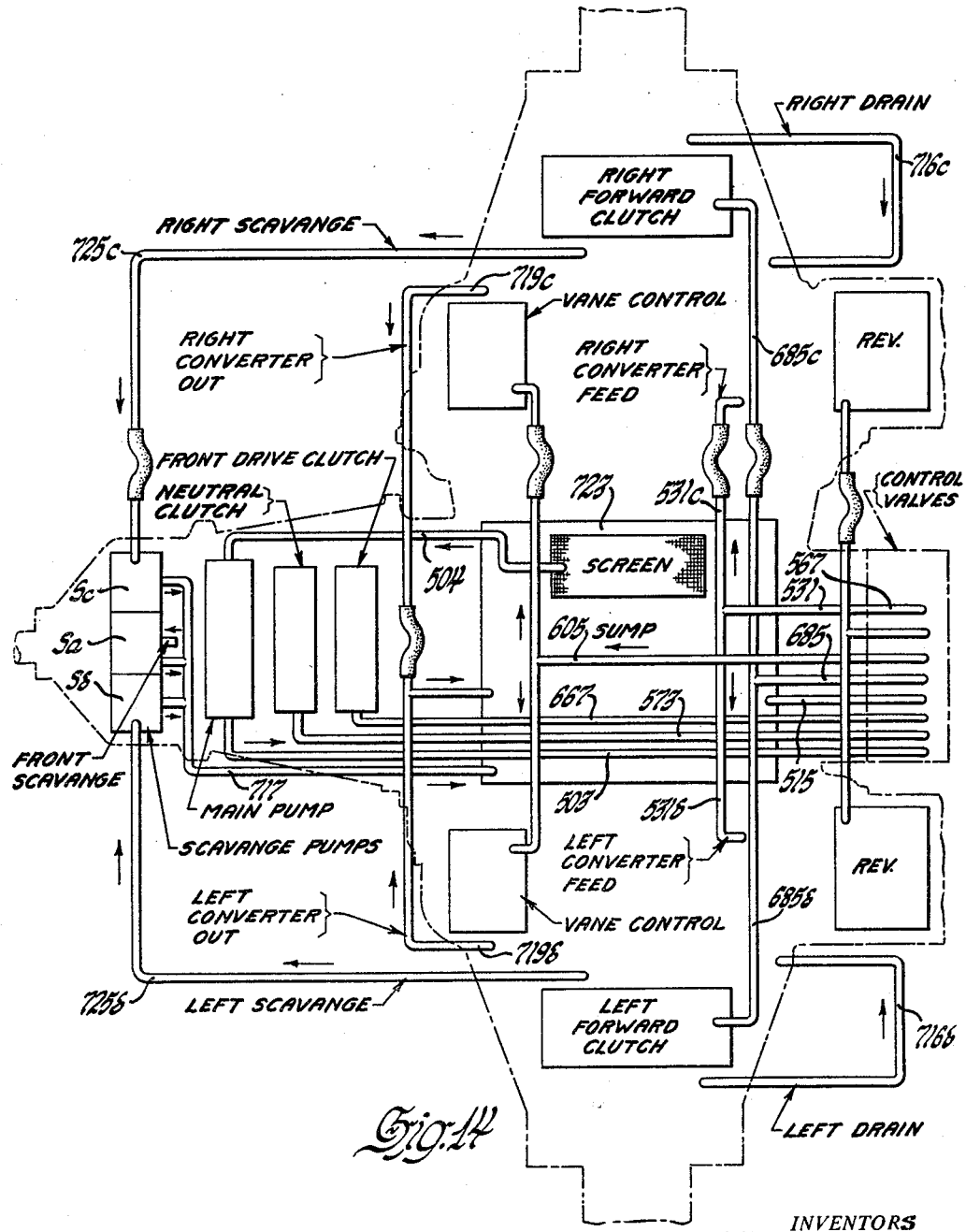

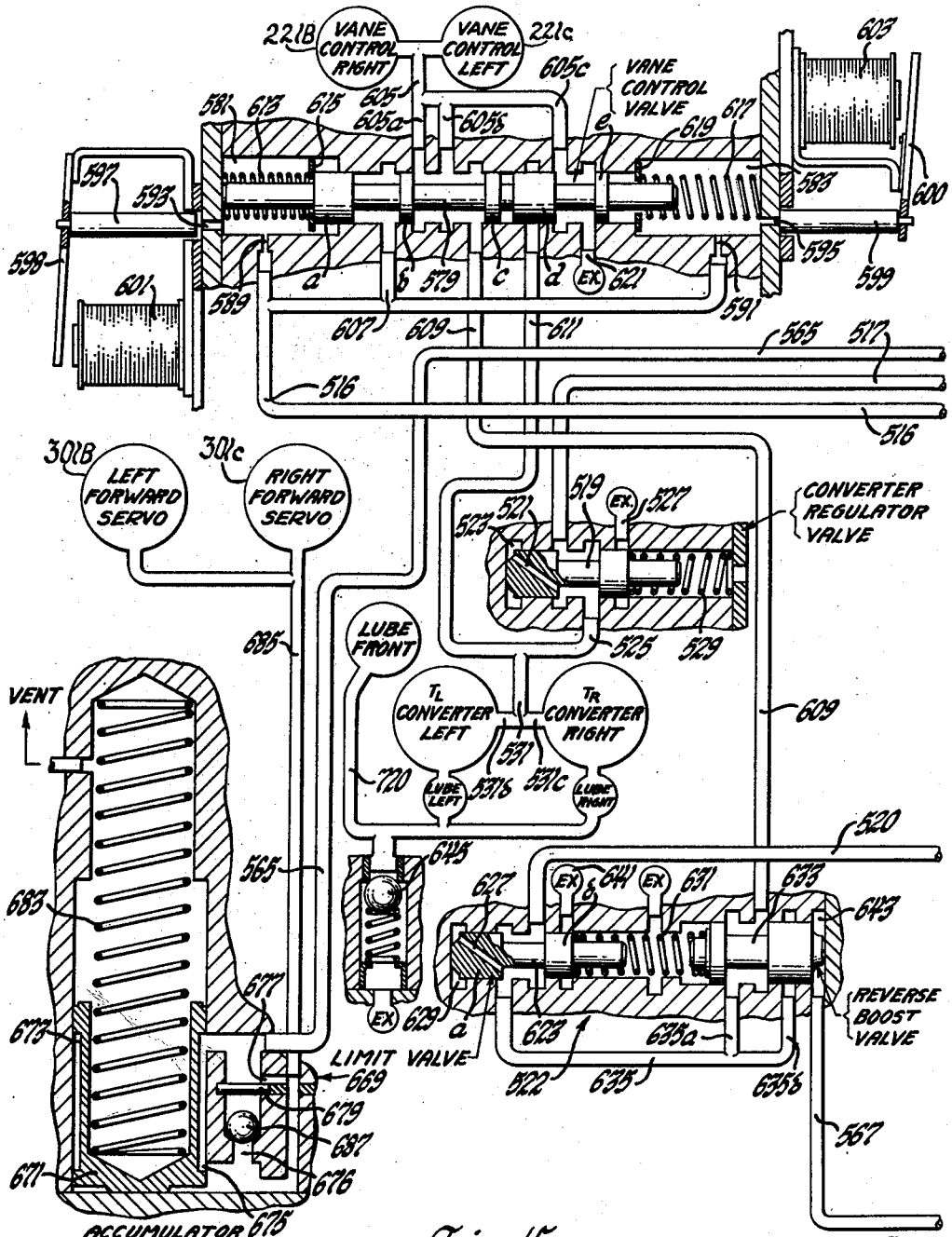

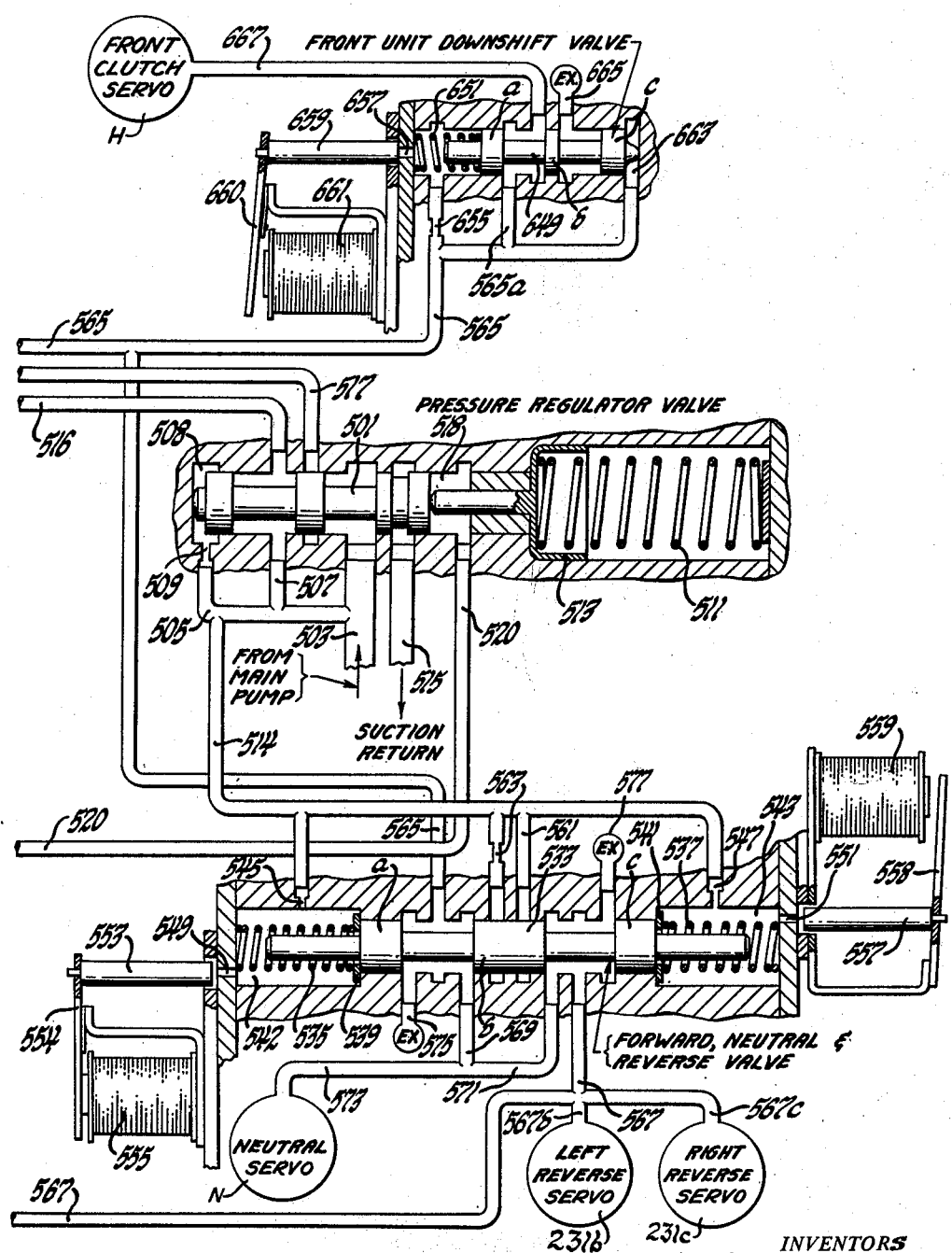

INVENTORS
Oliver K. Kelley,
Kenneth W. Gage, &
Richard W. Craig
BY Robert B. Gerhardt
ATTORNEY

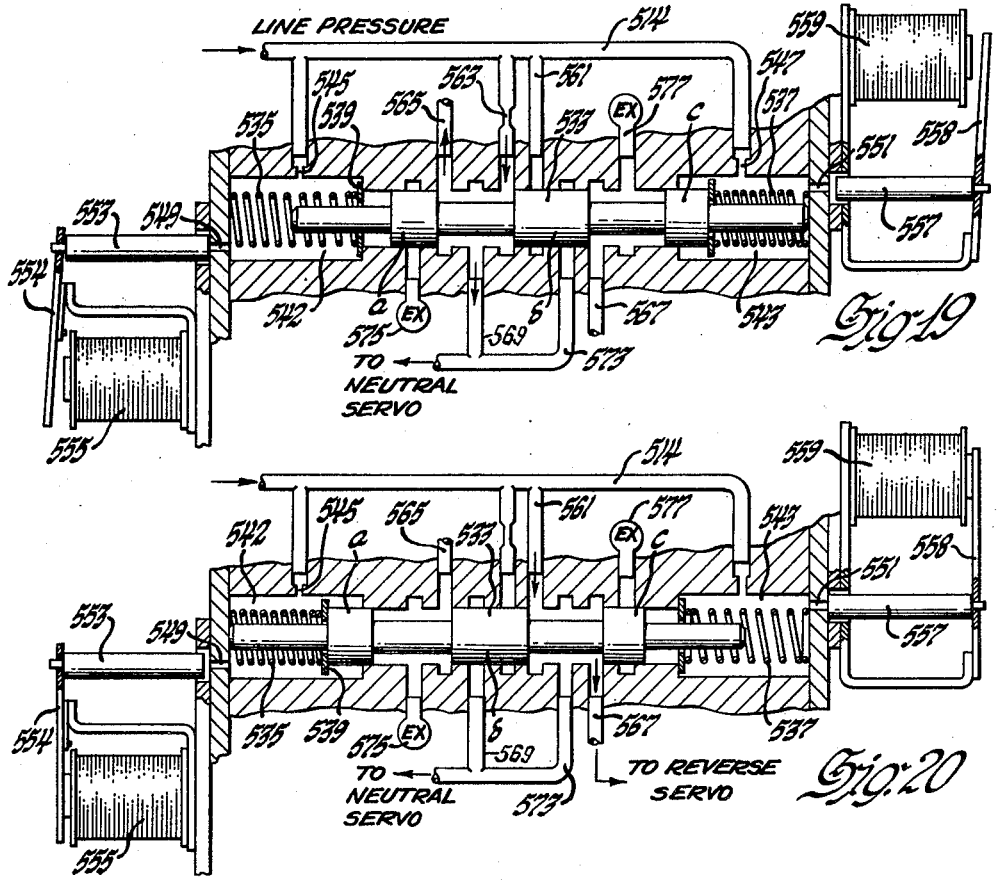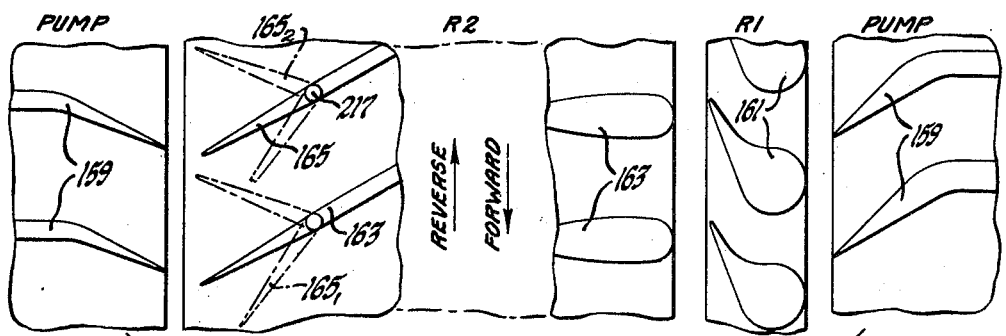

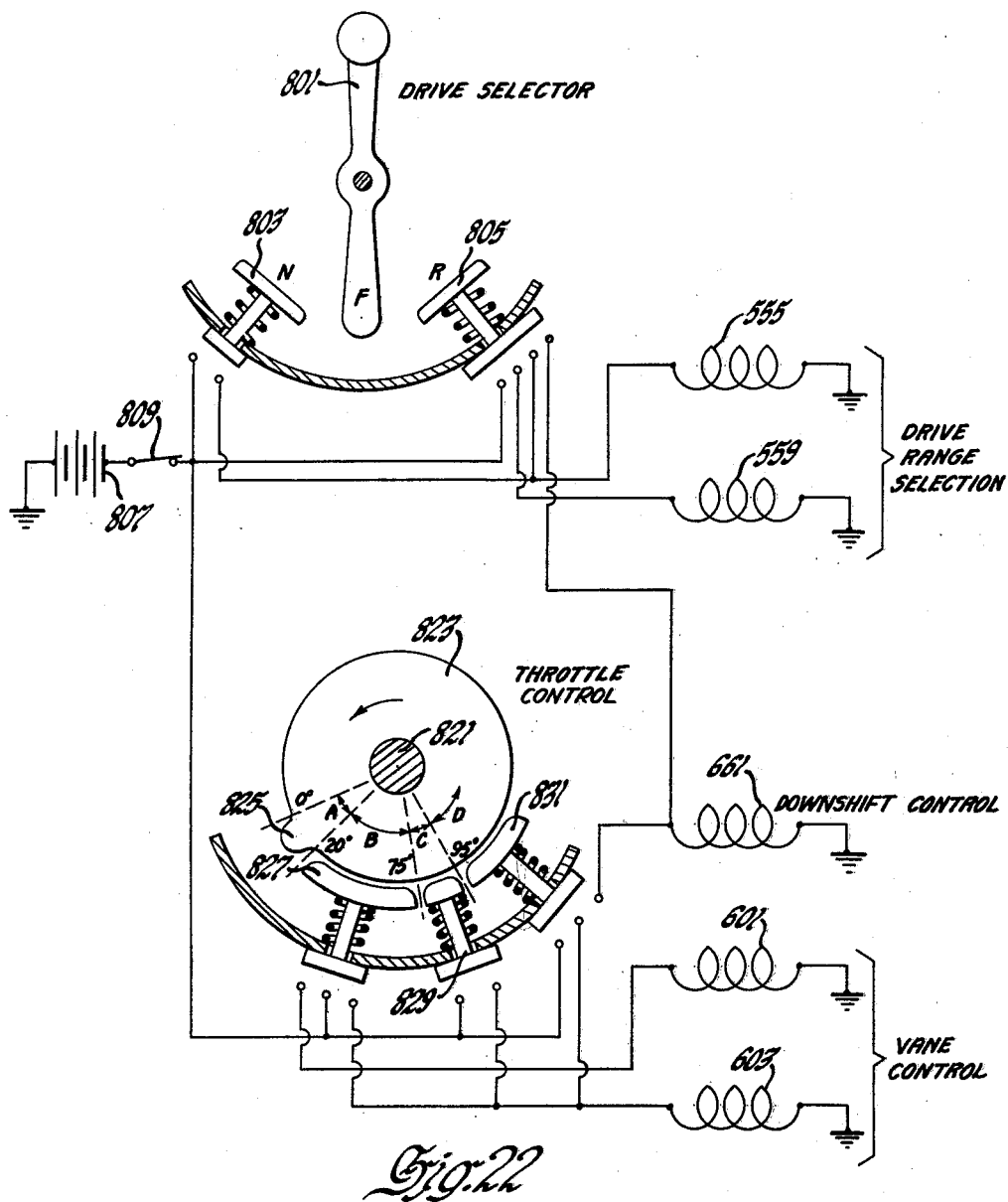

Feb. 23, 1965       O. K. KELLEY ETAL       3,170,534
    TRANSMISSION AND SWINGING DRIVE AXLES INCLUDING
                  TORQUE CONVERTERS
Filed Jan. 7, 1959                    19 Sheets-Sheet 19

INVENTORS
Oliver K. Kelley,
BY Kenneth W. Gage, &
Richard W. Craig
Robert B. Gerhardt
ATTORNEY United States Patent Office 3,170,534
Patented Feb. 23, 1965

3,170,534
TRANSMISSION AND SWINGING DRIVE AXLES INCLUDING TORQUE CONVERTERS
Oliver K. Kelley, Bloomfield Hills, Kenneth W. Gage, Birmingham, and Richard W. Craig, Flint, Mich., assignors to General Motors Corporation, Detroit, Mich., a corporation of Delaware
Filed Jan. 7, 1959, Ser. No. 785,390
9 Claims. (Cl. 180—73)

This invention relates to motor vehicle transmissions and more particularly to transmissions combined with vehicle independent drive axles and providing independent drive to each drive wheel.

Most present day motor vehicles utilize a change speed transmssion mounted at the rear of the engine and which drive a propeller shaft extending to a combined rear axle and differential gear unit at the rear of the vehicle. These differential units are necessary to allow for the driving wheels to rotate at different speeds when the vehicle is turning a corner. This differential action becomes a disadvantage when one wheel begins to slip, since all of the torque is then transmitted to the slipping wheel. If antislip mechanism is added to the differential gearing, the differential and, hence, turning characteristics are affected and the differential unit becomes quite complex.

Location of the transmission at the rear of the engine under the front of the passenger compartment necessitates a hump in the vehicle floor and requires a propeller shaft of relatively large size and strength to carry the engine torque multiplied by the maximum gear ratio of the transmission. While some rear mounted transmissions have been proposed that are structurally combined with the differential, these do not eliminate the necessity and disadvantages of the conventional differential. Also, independent drives to each driving wheel have been proposed, however, these usually require the full weight of the transmission and differential unit to be carried on the wheels resulting in a relatively large unsprung weight.

It is therefore an object of this invention to provide a combined transmission, differential and rear axle unit for a motor vehicle.

It is a further object to provide such a transmission unit that will independently drive each driving wheel.

A still further object is to provide a combined transmission and rear axle that has a minimum of parts and does not add unsprung weight to the wheels.

Another object is to provide an independent drive to each drive wheel with a pair of hydraulic torque transmitting devices and wherein forward and reverse drive are obtained in the hydraulic devices.

Still another object is to provide a multi-phase transmission with a relatively simple and yet effective control system that can be conveniently remotely operated by the vehicle operator.

These and other objects and advantages will be readily apparent from the following description and drawings which show an illustrated embodiment of the invention and in which:

FIG. 3 is a top view of the invention;

FIG. 4 is a side view of the invention looking from the left side;

FIG. 5 is a view looking at the rear of the invention;

FIG. 6 is an enlarged sectional view of a portion of the front unit;

FIG. 6a is another enlarged sectional view of other portions of the front unit and also part of the center unit;

FIG. 7 is a sectional view taken on the line 7—7 of FIG. 6 showing details of the three scavenge pumps;

FIG. 8 is an enlarged sectional view showing details of ports and oil passages in a support member in the front unit.

FIG. 9 is a cross-sectional view taken on the line 9—9 of FIG. 8;

FIG. 10 is a view showing how FIGS. 11, 11a, 11b and 11c are arranged to form a single large sectional view of left side, center, and part of the right side units;

Figure 16:
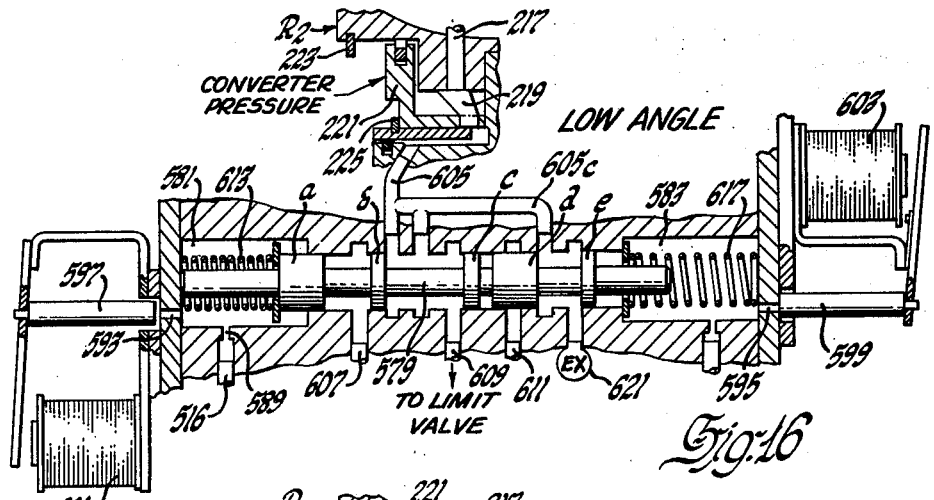
Figure 17:
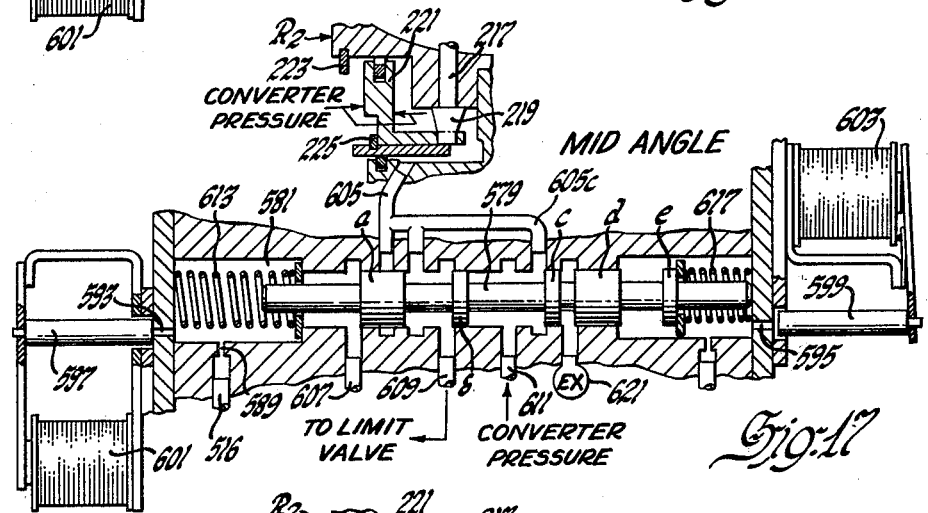
Figure 18:
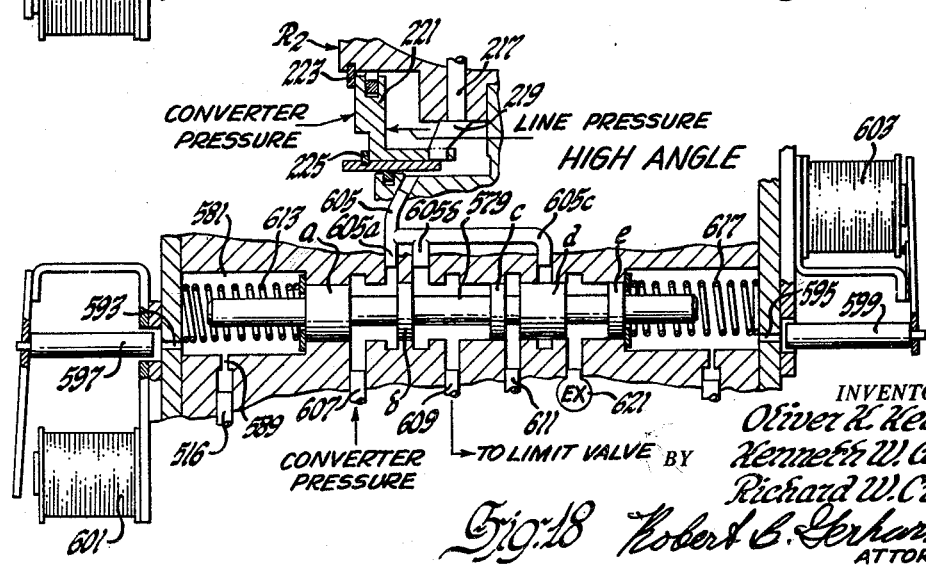
Figure 23:
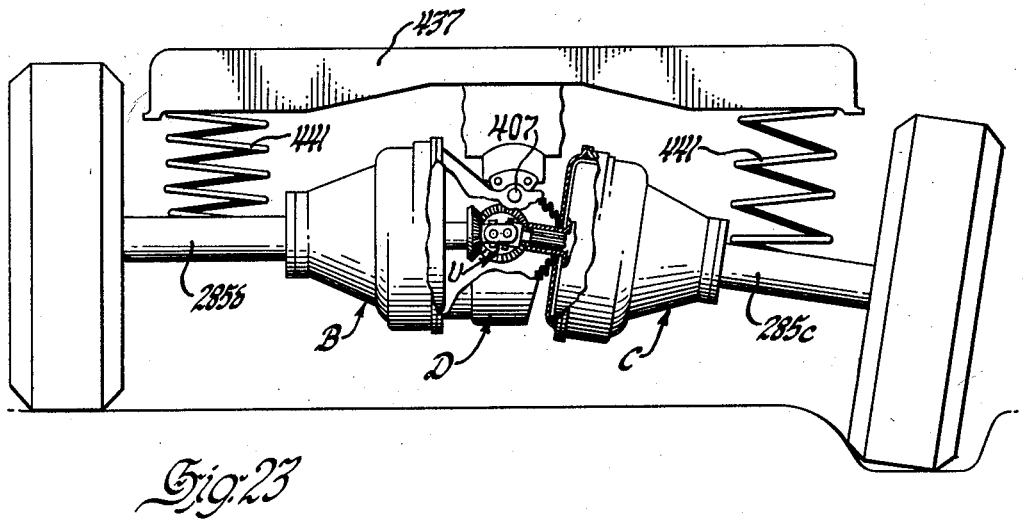
Figure 24:
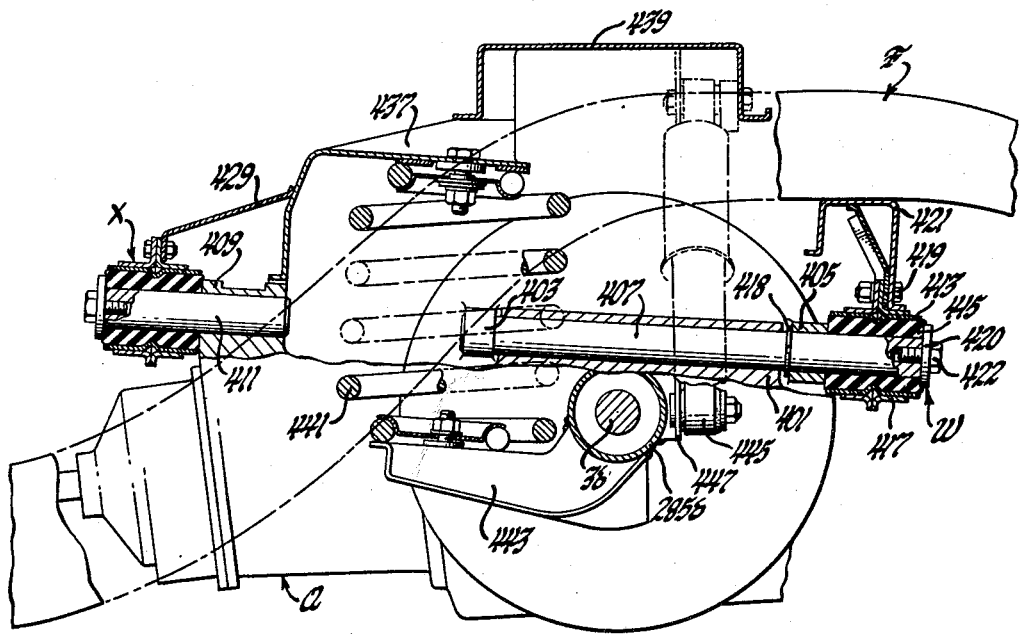
Figure 25:
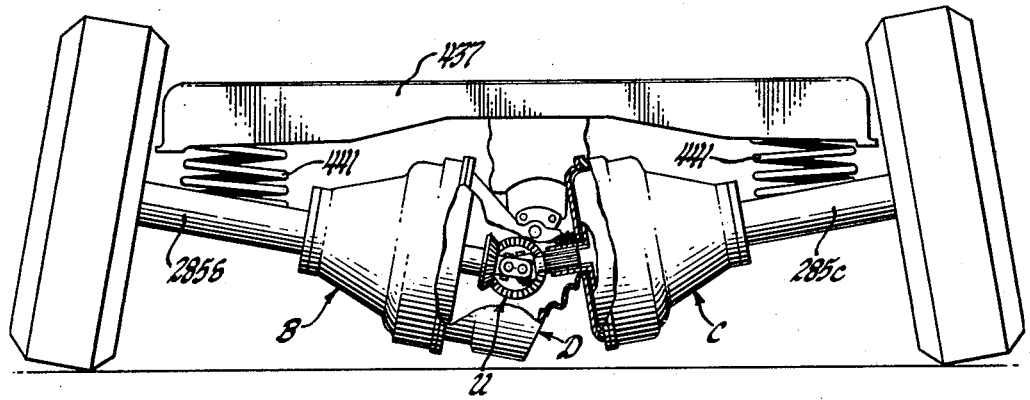
Figure 26:
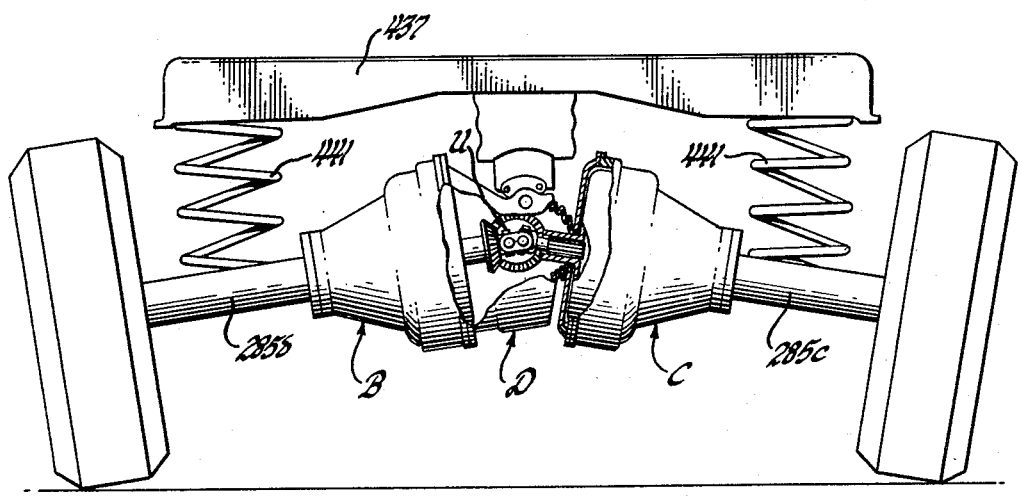

FIGS. 11, 11a, 11b, and 11c are sectional views taken on the line 11—11 of FIG. 3;

FIG. 12 is a cross-sectional view showing portions of the reverse band and reverse servo;

FIG. 13 is a schematic view of the functional parts of the drive train as seen from the top;

FIG. 14 is a schematic view of the hydraulic connections between various units;

FIG. 15 is a schematic view of part of the transmission control system;

FIG. 15a is a schematic view showing the parts of the control system not shown in FIG. 15;

FIG. 16 is a view of the variable vane control valve positioned for low angle;

FIG. 17 is a view of the variable vane control valve positioned for mid angle;

FIG. 18 is a view of the variable vane control valve positioned for high angle;

FIG. 19 is a view of the neutral, forward and reverse valve positioned for forward drive;

FIG. 20 is a view of the neutral, forward and reverse valve positioned for reverse drive;

FIG. 21 is a schematic view of the vane elements in one of the torque converters;

FIG. 22 is a schematic view showing the electrical controls for the transmission;

FIG. 23 is a schematic view illustrating the relationship of the parts during non-parallel deflection of the sprung mass;

FIG. 24 is a partially broken side view of the transmission mounting and suspension;

FIG. 25 is a view similar to FIG. 23 illustrating the relationship of the parts under conditions of parallel upward deflection of the sprung mass;

FIG. 26 is another view similar to FIG. 23 showing the relationship of the parts under conditions of parallel downward deflection of the sprung mass.

Briefly the invention includes an assembly forming a pair of independent rear axle units, each axle unit including an independent three element multi-phase torque converter combined with a planetary gear unit plus a final reduction fixed ratio planetary gear unit. The two axle side units are supported on a common pivot supported by the vehicle frame. Each side unit is driven from a right angle bevel gear set mounted within a center unit that is secured to the left side unit set. The left unit is directly driven by the bevel gearing and the right side unit is driven through a double universal joint located within the center unit and which allows pivotal movement of the right unit relative to the bevel gear set and left side unit. The right angle drive bevel gearing is driven by a front unit whose outer housing is secured to the center unit and which includes a balanced inertia two speed planetary gear unit that provides both a direct and a reduction drive of the two side units. The front unit, which is driven by the vehicle propeller shaft, also includes a neutral clutch, a main gear pump and three commonly driven scavenge gear pumps.

The right and left side three element torque converters each have an impeller and a pair of runners, each runner having two functions. The first runner functions as a multiplied torque turbine in forward drive while the second runner initially acts as a hydraulic stator and, subsequently, as a direct drive turbine in forward drive. In reverse drive, the first runner is held to function as a stator reversing the direction of oil flow while the second runner functions as a reversely driven turbine. A simple planetary gear set in combination with three one-way devices and a friction brake is connected to the two runners to provide an infinitely variable gear ratio multiplication as well as a split torque combiner. The second runner in each torque converter has a variable angle exit portion that can be controlled to change the operation of the converter according to the performance desired by the vehicle operator. The planetary gear unit of each side unit drives the final reduction planetary gear unit in its respective axle unit. The output of the final reduction units drive the final axle shafts on which the drive wheels are mounted.

The controls for the front unit, the side axle units and the variable vanes in the torque converter include electric solenoid controlled hydraulically actuated valves that connect pressure regulated oil from the main pump to various control servos in the front and side units. The valve control solenoids are actuated by switches operated by a driver controlled lever and an engine throttle position responsive cam. Wheel speed differences are absorbed by the hydraulic torque converters which also function to distribute the engine power to the wheels in proportion to the load on each wheel. The pivotal connection and support of the two transmission axle units allow independent up and down movements of the drive wheels.

Figure 1:
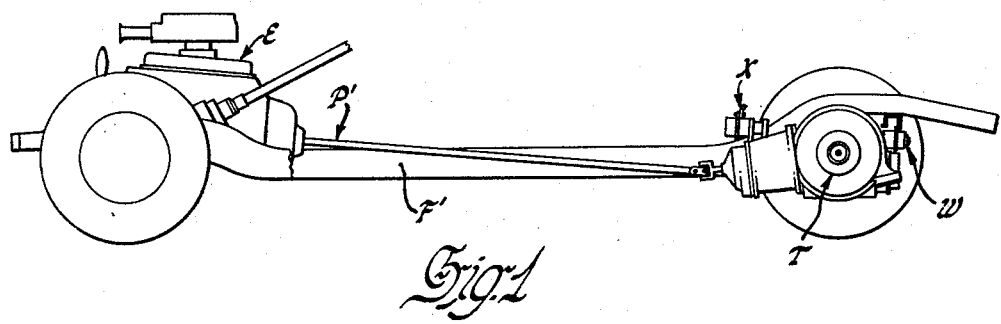
FIG. 1 is a side view of a vehicle chassis incorporating the invention.

Referring to FIG. 1 the invention is shown in a motor vehicle chassis having a frame F' supporting an engine E connected to drive a propeller shaft P' extending to the rear of the vehicle. The shaft P' is connected to drive the input of the combination transmission and axle unit T. The transmission is pivotally supported by the frame at the front by a support assembly X and at the rear by a support assembly W.

Figure 2:
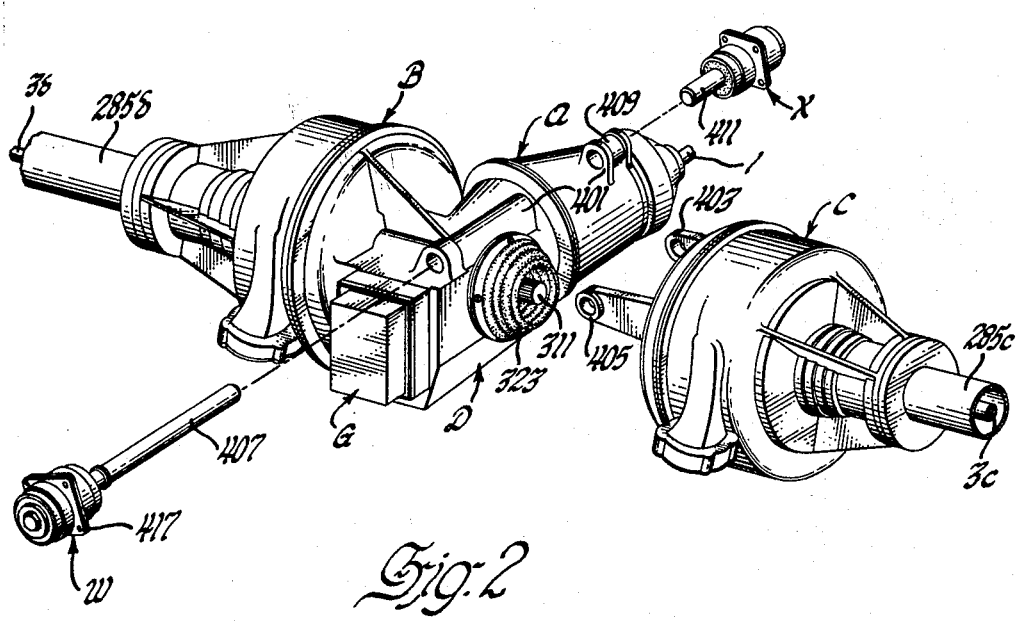
FIG. 2 is a semi-exploded perspective view of the combined transmission and rear axle unit showing how the various units are connected.

FIG. 2 shows the combined transmission and rear axle unit partially exploded for clarity. The transmission and rear axle consists of four basic units. A two speed input gear unit, generally designated A, is fastened to a center unit, designated D, and which in turn is fastened to a left side combined torque converter and gearing unit B. A right side combined torque converter and gearing unit generally designated C, is pivotally connected to the center unit D by a pivot supporting the whole assembly in the vehicle. FIG. 3 shows a top view of the combined unit with the axle shafts shown extending from each side axle unit; FIG. 4 a side view of the combined unit looking from the left side; and FIG. 5 a rear view of the transmission unit.

*Front unit A*

Referring now to FIGS. 6 and 6a, which show the details of the input transmission unit A, the input unit A has a forward case member 5 and a main case member 7. An engine driven input shaft 1 which may be the propeller shaft extends through an oil seal 2 into the case 5 and is splined into a sleeve shaft 9. Bearing 11 supports the sleeve shaft 9 in the casing 5 at its front end and a bearing 13 supports the shaft 9 in the case member 7 at the rear of shaft 9. Located within the front case member 5 is a conventional type crescent gear main pump, generally designated M, which includes a drive gear 15 splined on the sleeve shaft 9. The drive gear 15 is rotatable in a main pump body 17 and has external teeth 18 that mesh with internal teeth 20 of a driven gear 21. A crescent member 19 separates the gears 15 and 21. Ports, not shown, formed in the valve body 17 connect the conduits for supplying oil to the main pump and in receiving oil under pressure from the pump.

Also located in the forward housing or case member 5 is a scavenge pump assembly, generally designated S and which includes three gear pumps. Referring to FIGS. 6 and 7, it will be seen that the scavenge pump assembly S includes a body member 23 attached by any suitable means, not shown, to the main pump body 17. A single drive gear 25 splined on the sleeve shaft 9 meshes with three driven gears 27a, 27b and 27c which are journalled on pins 29 held by the scavenge pump body 23.

Adjacent each drive gear 25 is a scavenge suction inlet port 30 and a pressure outlet port 31 formed in the pump body 23. Each suction port 30 is connected by a conduit to a dry sump in one of the transmission units. One suction port is connected to the front unit A, one to the left unit B and one to the right unit C. FIG. 6 shows only a passage 32 which leads to the dry sump formed by case member 7 of unit A. The outlet ports 31 connect through passages, not shown, formed in the pump body to a common discharge conduit that leads to the main sump located in the center unit D.

The sleeve shaft 9 terminates in a flange 33 that carries a ring gear 35 of a planetary gear unit generally designated K. The ring gear 35 is held on the flange 33 by snap ring 37 and is caused to rotate with the shaft 9 by one or more teeth 38 engaging in slots 40 in the ring gear 35.

The gear unit K also includes three planet pinion gears 39 rotatably mounted by roller bearings on pinion gear shafts 41 that are supported by a planet carrier member 43. The planet carrier 43 is splined on an intermediate shaft 47 that has a flange 49 at its rearward end. The flange 49 forms a pressure plate of a clutch assembly N to be later described. A sleeve member 50 has teeth 51 that form a sun gear meshing with the planet pinions 39. Sleeve 50 is splined to a disk member 53 formed as part of a large annular inertia mass 55 that surrounds the gear unit K and neutral clutch N.

The weight 55 has a flanged end plate 57 bolted thereto forming a clutch cylinder. Fastened to the plate 57 by rivets 63 is an outer race 61 of a low speed conventional freewheel device, generally designated L. Rollers 65 are located in cam slots formed in the outer race 61 and engage the inner race 67. The freewheel device L, the details of which form no part of the invention, may be of any other suitable form such as a sprag clutch. The inner race 67 is fastened by any suitable means to a reaction shaft and support member 69 secured in the housing 121 of the center unit D.

The neutral clutch N comprises a driven drum member 71 having a disk section 73 forming an annular cylinder for a piston 75. A Belleville spring 77 has one end anchored in the drum 71 by a snap ring 81 and bears at its center on clutch pressure plate 79. A plurality of outer driving plates 83 splined in the drum 71 are interposed between a plurality of inner driven plates 85 that are splined to a sleeve member 89. Sleeve 89 is internally splined on a front unit output shaft 91. Snap ring 87 serves to hold flange 49 formed on the end of the intermediate shaft 47 located in the drum 71.

The high speed or direct drive clutch, generally indicated H, includes a piston 93 slidably fitted in an annular cylinder formed by the end plate 57 bolted to the inertia weight 55. A plurality of separator plates 95 are splined to the inside of the weight 55 and are interposed between corresponding friction plates 97 splined on a flange 99 formed on drum 71. Drive plate 101 limits forward movement of the clutch stack. A direct drive clutch release spring 103 has one end bearing on a retainer ring 105 secured in the cylinder 57 by a snap ring 107, and its other end on the piston 93. The neutral clutch drum member 71 and direct drive clutch cylinder member 57 are rotatably supported on the stationary reaction sleeve 69 by lubricated bearing sleeve 109 and 111, respectively.

Oil under pressure for operation of the neutral clutch N and the direct drive clutch H is supplied through passages formed between the support sleeve member 69 and flat surfaces formed on the outside of a liner member 113 fitted inside the stationary sleeve 69. As seen in FIGS. 8 and 9, there are three passages 115a, 115b and 115c. Passage 115a is a lubrication feed and leads from a radial drilled hole 116 that connects with an external converter outlet oil pipe, not shown. An aperture 117 in liner 113 leads from passage 115a to the outside of shaft 91 from where oil can pass through a passage 118 formed in the shaft 91 and into various lubrication points in the front unit A.

Passage 115b connects with a port 119 in member 69 leading to the neutral clutch cylinder 71 and also with radial passage 120 formed in the support member 69. Likewise the lower passage 115c connects a port 122 leading to the direct cylinder 57 of the direct drive clutch H with radial passage 124. Radial passages 120 and 124 connect with conduits, not shown in FIG. 6, leading to a control valve assembly described later.

*Center unit D*

As seen in FIGS. 2, 3 and 6a, the case member 7 of the front unit A is secured by bolts 123 to a case member 121 which encloses the center unit D. Included in the center unit D is a bevel gear 125 formed integral with the front unit output shaft 91. The shaft and bevel gear are supported by a double bearing assembly which includes an outer drum 127 secured to the outer case 121 by bolts 128 and which holds a pair of outer bearing races 129. Two sets of tapered rollers 131 are interposed between the outer races 129 and a pair of inner races 133 that are fitted on the shaft 91. A nut 135 is threaded on the shaft to 91 to hold the bearing assembly in place and to properly load the bearings. Other forms of bearings could be used to provide a combination radial and thrust bearing. The bevel gear 125 meshes with a second bevel gear 139 shown in FIGS. 6a and 11a. Gear 139 has its axis at right angles to the axis of gear 125. The center unit D also includes a double universal joint, generally designated U and described below.

*Left and right side axle units*

Figure 11A:
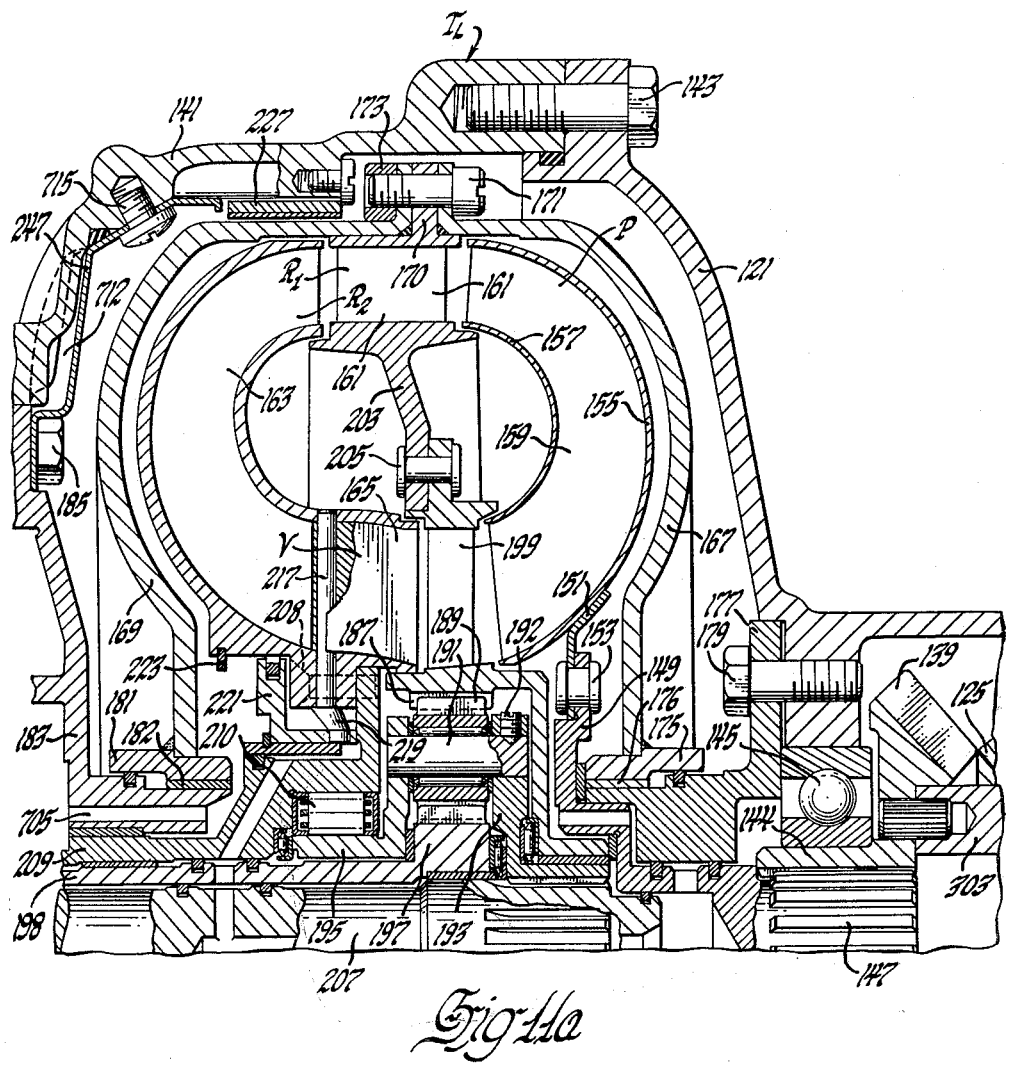
Figure 11B:
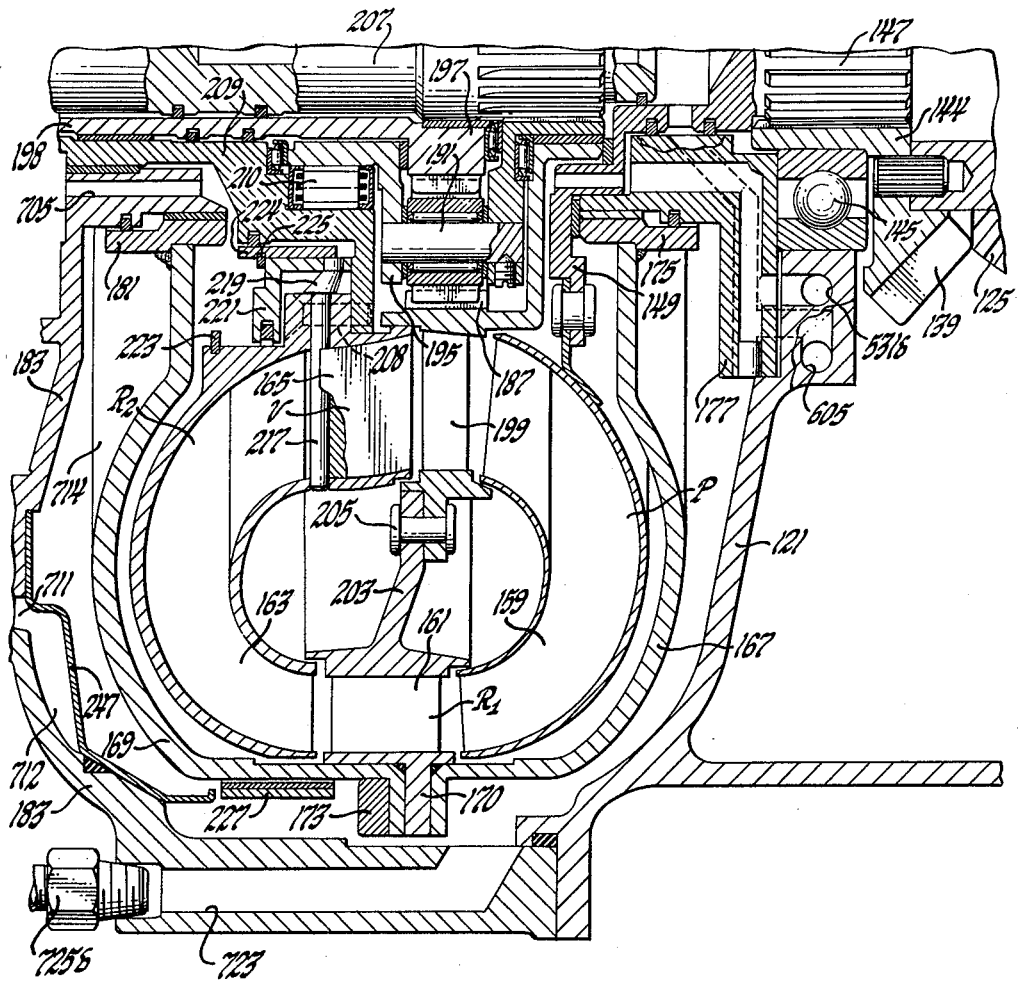

The left and right side axle units B and C include essentially the same mechanical parts and where the parts are identical the same reference numbers have been used in the illustrations of the two units. Only the left unit is fully shown in detail and will be fully described. The left torque converter and gear unit B, best shown in FIGS. 11, 11a and 11b, is enclosed in an outer case member 141 which is secured to the center unit case 121 by bolts 143.

The driven bevel gear 139 has a hub portion 144 that is splined on a torque converter input shaft 147 and which is rotatably supported in the center unit case 121 by ball bearing 145. The left torque converter unit, generally designated $T_L$, includes an impeller assembly P having a driving and support ring 151 secured by rivets 153 to a flange 149 formed on the input shaft 147. The impeller P has an outer shroud 155 and an inner shroud 157. A plurality of vanes 159 are held in a spaced relationship by the shrouds 155 and 157.

The torque converter $T_L$ also includes a first runner $R_1$ having axial flow vanes 161 and a second runner $R_2$ having main radial flow vanes 163. The second runner $R_2$ has a variable axial flow exit portion V that includes vanes 165 pivotally mounted by crank pins 217 on the runner $R_2$. The three fluids elements P, $R_1$ and $R_2$ are enclosed by an outer shroud or shell composed of members 167 and 169. A ridge 170 formed as part of $R_1$ is held between shroud elements 167 and 169. The assembly of 167, 170 and 169 is secured together by bolts 171 threaded into a retaining ring 173. The shroud assembly is supported for rotation by a ring 175 welded or otherwise secured to the shroud member 167 and by a similar ring 181 secured to the shroud member 169. Ring 175 rotates on a bearing 176 surrounding a hub member 177 held by bolts 179 to the center case 121 and ring 181 rotates on a bearing member 182 surrounding a hub portion formed on a support member 183. The support 183 is secured by bolts 185 to the left unit case 141 (FIGS. 11 and 11a).

Enclosed within the torque converter $T_L$ is a planetary gear set having a ring gear member 187 meshing with a plurality of planet pinions 189 rotatably mounted on pinion shafts 191 secured by screws 192 to a planet carrier composed of a right hand member 193 and a left hand member 195. Also meshing with the planet pinions 189 is a sun gear 197 formed integral with a sleeve shaft 198. The flanged member 187 forming the ring gear has spokes 199 that lead into the "eye" of the torque converter and are connected by rivets 205 to an inward extending flange 203 formed integral with $R_1$.

The planet carrier member 193 is splined on an output shaft 207 and the second runner $R_2$ is secured by rivets 208 to a stepped sleeve shaft 209. Located between the second runner shaft 209 and the left hand carrier member 195 is a one-way clutch 210 shown as a sprag clutch, but which may be of any suitable form. The one-way device 210 allows the carrier member 195 to rotate faster in a forward direction than the second runner $R_2$ but allows the second runner to drive the carrier directly when $R_2$ rotates faster than the carrier. Splined to the second runner shaft 209 is the inner race 211 of another one-way device shown having rollers 215 and an outer race 213 in the form of a stepped cylinder. The member 213 is internally splined to the sleeve shaft 198 as shown in FIGURE 11.

As mentioned above and referring in particular to FIGS. 11a and 11b the second runner variable exit vane portion V has vanes 165. These vanes 165 are each secured to a pin 217 that is offset at 219 to form crank fitted into an annular piston member 221. The piston 221 is slidably mounted in the runner $R_2$ which has a stop ring 223 for limiting movement of piston 221 to the left as viewed in the figure. The piston 221 fits over a ring 224 slidably mounted on the second runner shaft 209 and held in place by a snap ring 225. It should be noted that piston 221 is exposed on one side of the converter oil pressure which biases the piston to the right as seen in the figure.

Surrounding the torque converter shroud member 169 is a reverse drive friction band 227 connected at one end to a movable rod 229 (FIG. 12) and at the other end by an anchor lug 230 located in a formed cavity in the left unit outer case 141. The rod 229 is actuated by a reverse piston 231 acting through a spring 233 which bears on a seat 235 that engages a step 241 formed on the rod 229. The piston 231 moves against an outer reverse band release spring 237 that bears on one end against a retainer ring 239 in turn bearing against a surface 240 formed with a reverse servo housing 245 formed as part of the left unit case member 141. Downward sliding movement of the piston 231 on the rod 229 by the spring 237, is limited by a bolt 243 threaded into the end of the rod 229. Piston 231 reciprocates within a combination cylinder and cover member 246 and is urged to apply the band 227 and wrap it on shroud member 169 by fluid pressure acting on the piston and supplied through a passage 249 formed in the cover 246.

Referring to FIG. 11 it will be seen that there is another planetary gear set generally designated R and which provides a final reduction in speed. This gear set R includes a sun gear 261 splined on the torque converter output shaft 207. Meshing with the sun gear 261 are planet pinions 263, only one of which is shown, journalled on pinion shafts 265 supported by a carrier member 267. A ring gear 271 also meshes with the planet pinions 263 and is secured to the housing 141 and held against axial movement by snap ring 273 and against rotation by any suitable means, such as a key, not shown.

The carrier member 267 is rotatably supported in a hub 275 formed integral with the case member 141. The carrier 267 is splined on an axle shaft 3b leading to the left drive wheel. Secured on the outer surface of the carrier shaft 267 is a speedometer gear 277 that meshes with a worm gear 278 secured to drive a speedometer shaft 280. An oil seal 279 prevents leakage of oil from within the gear unit into an axle housing 285b which surrounds the axle shaft 3b and which is welded or otherwise secured to an end cover 281 bolted to the outer case 141.

The outer race 213 of the aforementioned freewheeler 215 is stepped to also form an inner race of a one-way sprag device 287 having an outer race 289 and an inner race 286 formed integral with race 213. Friction disks 291 are splined to the outer race 289 and are interposed between separation plates 293 and a pressure plate 295, all of which are splined to the stationary cylinder member 183. A Belleville spring 297 acts between the pressure plate 295 and an annular forward drive piston 301 slidably mounted in the stationary cylinder 183. A snap ring 299 anchors one end of the Belleville spring 297 to provide a mechanical lever multiplication of force exerted by fluid pressure operated piston 301. The disks 291 and 293 form a forward drive reaction establishing device generally designated F. The forward drive piston 301 is actuated by oil under pressure introduced into cylinder 183 through a port 300 connected to a space 302 in turn connected to a conduit 685b (FIG. 12) on the exterior of the transmission leading to the control valve assembly described below.

Referring again to FIGS. 11a, 11b and 11c it will be seen that the center unit bevel gear 139 is secured to a driving yoke 303 of a universal joint, generally designated U. This type of joint is commonly known as a floating yoke close coupled double universal joint. A spider 305 connects the yoke 303 with a double intermediate yoke 307 that carries one element of a driven cross spider joint 309, the other element of 309 being carried in an output yoke and stub shaft 311. The outer universal joint member 303 is supported at its right end in the center case 121 by a ball bearing assembly 313 held in place by a snap ring 315. Operation of the universal joint U is fully described in the co-pending application S.N. 758,423, now abandoned, entitled "Independent Rear Wheel Suspension," filed Sept. 2, 1958, in the name of Oliver K. Kelley and assigned to the assignee of the present invention.

The universal joint output shaft 311 is slidably splined into a right unit input sleeve shaft 317 that corresponds to the left unit input shaft 147. The remainder of the details of the torque converter and associated gearing in the right unit C are not shown or described, since they are the same as those in the left unit B, described above. The right unit C has an end cover plate 319 having a hub portion 321 which forms a bearing support for the input shaft 317. A rubber boot 323 is secured to the center unit case 121 by a retainer 325 and bolts 327, and to the right unit cover 319 by a lip 328. A gasket 329 and an O ring 331 cooperate with the boot 323 to prevent dirt and moisture from entering the center unit D and to prevent leakage of oil from that unit. The right unit cover plate 319 is secured by bolts 337 to the right unit outer case 335 similar to the left unit case 141.

Mounting and pivot supports

The various units of the transmission and axle assembly are positioned and connected as shown in FIGS. 2, 3, 4 and 5. The center unit D has a longitudinally extending hollow support member 401 formed integral therewith. The right unit C has a pair of spaced support arms 403 and 405 integral with the cover plate 319 and encompassing the ends of support 401. A rear pivot pin 407 extends through the arm 405, support 401 and arm 403 to pivotally support unit C.

Formed integral with the case 7 of the front unit A is a front pivot support 409 into which a front pivot pin 411 extends. The rear pin 407 is supported at its rear end by a support assembly generally designated W and the front pin 411 by a support assembly designated X. The two pivot pins 407 and 411 have a common axis that is inclined relative to the ground level. The details of the supports X and W are best seen in FIG. 24. Support W includes a sleeve 413 surrounding a rubber bushing 415 which in turn surrounds the end of pivot pin 407. A bracket member 417 encompasses the sleeve 413 and is secured to a structural cross member 421 by bolts 419. The cross member 421 is attached to the frame F in any suitable manner. The pin 407 is axially held in place by a washer 420 and bolt 422 and a snap ring 418.

The front pivot support assembly X is similar to the rear assembly W and is supported by a structural member 429 in turn supported by a cross member 437. As seen in FIG. 23 the structural cross piece 437 can also serve as a support for rear suspension coil springs 441. The lower end of the springs rest on arms 443 welded or otherwise secured to the axle housings 285b and 285c. Shock absorbers 445 are interposed between brackets 447 also secured to the axle housings 285b and 285c and a rear frame cross member 439. Details of the suspension and its operation as well as the advantages of the inclined pivot axis are more fully shown and described in the co-pending application S.N. 758,423 referred to above.

Control valves

A schematic representation of the hydraulic and electrical control system is shown in FIGS. 15 and 15a. The valves and associated solenoids are enclosed in a valve body designated G, that is bolted on the rear of the center unit D (FIGS. 2 and 5). A schematic diagram of the piping and conduits between the pumps, control valves, and the various control elements in the units A, B, C and D is shown in FIG. 14. In general, the conduits leading to and from the left side axle unit B are designated by numbers having a subscript b while the corresponding conduits leading to the right side axle unit are designated by numbers having the subscript c. It is to be noted that all conduits and pipes leading to the right side axle unit have a flexible section therein so that the right unit C can freely pivot relative to the other units without straining the pipes and conduits leading to the right side unit.

Pressure regulator valve

Connected to the main pump M by a pressure discharge passage 503 is a pressure regulator valve 501. The pressure regulator valve 501 hereinafter referred to as the PR valve, is of conventional construction and acts to maintain a selected predetermined main line pressure in passage 503. Branching off passage 503 are passages 505 and 507 with branch 505 connecting to a chamber 508 at the left end of the valve 501 through an orifice 509.

Oil under pressure from the main pump M acts through passages 503, 505, orifice 509, and chamber 508 to urge the valve 501 against a spring 511 to the right as seen in FIG. 15a. A plunger 513 transmits the force of spring 511 to the valve 501. As the pressure from the pump builds up this pressure acting in chamber 508 will move the valve 501 to the right compressing spring 511 until main line passage 503 is connected to a converter feed passage 517. As long as the conduit 517, which feeds the torque converters, can absorb the full output of pump M, the valve will regulate the pump pressure utilizing conduit 517 as a relief port. When conduit 517 cannot exhaust sufficient oil from pump M to maintain the pressure at the fixed level dependent on the force of spring 511 and any force of oil under pressure in chamber 518, the PR valve will be moved by the excess pressure further to the right until the suction return conduit 515 can relieve the excess pressure. The discharge passage 515 may be directly connected to the main pump inlet passage 504 or may discharge directly into the transmission oil sump located in the bottom of center unit D.

The PR valve maintains a predetermined pressure in line 503 in known manner by exhausting pressure in excess of the predetermined pressure to the converter feed passage 517 and the discharge passage 515. In the illustrated example, the spring 511 may be chosen so that when no pressure exists in chamber 518 the pressure will be regulated at 70 p.s.i. If the exposed area of the right end of valve 501 is one square inch, then whatever pressure exists in chamber 518 will be added to the 70 p.s.i. basic pressure regulated by spring 511 alone. For example, if the pressure in chamber 518 is 55 p.s.i. then the PR valve will regulate the main line pressure in conduits 503, 516, 514, etc. at 70 plus 55 or 125 p.s.i. The pressure in chamber 518 is controlled by a limit valve acting in combination with a vane control valve to be later described. The main line pressure in line 503 is also always connected to a vane control feed line 516 and a shift valve feed line 514. A control chamber 518 at the right hand end of valve 501 is connected to a passage 520 leading from a limit valve 522. By varying the pressure in chamber 518 the pressure level maintained by the PR valve can be varied to provide optimum main line pressure in the system.

*Converter pressure regulator valve*

Oil under pressure from the regulator valve 501 passes through line 517 to a converter regulator valve 519 which serves to supply a fixed pressure to the right and left hand converter units. Oil pressure from line 517 acts through a drilled hole 521 to a chamber 523 where it urges valve 519 to the right against a spring 529. Valve 519 functions to alternately connect a final converter feed line 525 with the passage 517 and with an exhaust port 527 to maintain a predetermined pressure such as 55 p.s.i. in the line 525. The left converter unit $T_b$ is fed through a main passage 531 and a branch pipe 531b while the right converter unit $T_c$ is fed through passage 531 and a branch pipe 531c.

*Forward, neutral and reverse valve*

Regulated line pressure in conduit 505 is fed by means of conduit 514 to a main shift valve hereinafter generally referred to as the Forward, Neutral and Reverse or FNR valve. The FNR valve is one of three valves that are electrically controlled and hydraulically actuated. The FNR valve assembly includes a spool valve member 533 having lands *a*, *b* and *c*, and slidably mounted in a valve body. A pair of springs 535 and 537 act through washers 539 and 541 to normally hold the valve 533 centered in a neutral position as shown in FIG. 15a. Each spring is located within a chamber formed in the valve body and into which the reduced diameter opposite ends of the valve member 533 extend. Regulated line pressure from conduit 514 is continuously fed into the left hand chamber 542 through a calibrated inlet orifice 545 and the right hand chamber 543 is likewise fed through a similar calibrated inlet orifice 547. Each chamber has a second calibrated outlet orifice of larger area than its inlet orifice. The left chamber 542 has an outlet 549 and the right chamber 543 has a similar outlet 551. These outlet orifices 549 and 551 are opened and closed by valves 553 and 557 respectively. The valves 553 and 557 are actuated by armatures 554 and 58 of a pair of solenoids 555 and 559 respectively. Solenoids 555 and 559 are remotely controlled by a drive selector switch such as that shown in FIG. 22 and whose operation will be described later. It should be noted that the left armature 554 is spring urged to a valve closed position while the right armature 558 is spring urged to a valve open position. These spring urged positions that exist with the solenoids de-energized will be referred to as normally closed and normally open positions.

The central land *b* of valve 533 normally closes both a feed passage 561 connected to the regulated pressure conduit 514 and a second feed passage having a flow limiting orifice 563. The space between lands *a* and *b* in the neutral position shown in FIG. 15a acts to connect both a forward feed passage 565 and a neutral feed branch passage 569 to an exhaust port 575. The branch passage 569 is connected to a main neutral clutch feed conduit 573. Similarly the space between lands *b* and *c* normally connects both a reverse feed passage 567 and a second neutral feed branch 571 to an exhaust port 577. Branch conduit 571 is also connected to the main neutral clutch feed passage 573.

The various conditions of the FNR valve are illustrated in FIG. 15a along with FIGS. 19 and 20. The center or neutral position is shown in FIG. 15a wherein both the reverse apply passage 567 and the forward apply passage 565 are connected to exhaust. The neutral clutch apply line 569 is also connected to exhaust through branches 569 and 571. The center position occurs when solenoid 555 is energized to open the normally closed valve 553 and allow the pressure in chamber 542 to drop while solenoid 559 is simultaneously de-energized allowing the normally open valve 557 to allow the pressure in chamber 543 to also drop. The centering springs 535 and 537 will then center the valve as shown in FIG. 15a. It should be noted that the springs 535 and 537 can only move the valve member 533 a limited distance because of the washers 539 and 541 engaging stepped portions in the valve bore. This insures positive centering even though the springs may not have exactly the same strength.

If solenoid 555 is de-energized, the spring on armature 554 will close valve 553 allowing the pressure to build up in chamber 542 and move the valve to the forward drive position shown in FIG. 19. Main line prepressure from feed conduit 514 then passes through orifice 563 into both the forward apply line 565 and the neutral apply line 569, 573 whereby the forward servos 301B and 301C and neutral servo N are actuated to establish forward drive. The reverse apply passage 567 remains connected to exhaust port 577. In the event of electrical failure in the controls or in the vehicle electrical system the FNR valve will asume the forward position shown in FIG. 19.

If both solenoid 559 and solenoid 555 are energized the valve will assume the left hand reverse drive position shown in FIG. 20. With solenoid 559 energized the normally open valve 557 closes the orifice 551 allowing pressure to build up in chamber 543. With solenoid 555 also energized the normally closed valve 553 is opened preventing any pressure build up in chamber 542. The unbalanced pressure existing in chamber 543 then moves the valve 533 to the left to the reverse position shown in FIG. 20. At this time the forward apply passage 565 is connected to exhaust port 575 while the unrestricted feed passage 561 is connected to the reverse servo apply passage 567 and to the neutral apply passage 573 whereby both the reverse bands 227 are applied by the right and left reverse servos and the front unit neutral clutch N is also applied. Operator control of the solenoids 555 and 559 will be described later.

*Vane control valve*

Located within the valve body G is another three position solenoid controlled valve that functions as a vane angle control valve and which is hereinafter referred to as the VC valve. This VC valve acts to control the vanes 165 of the variable exit portions V of the runners $R_2$ in the right and left torque converters. As will be more fully explained later, the position of the variable vanes 165 is determined by the level of fluid pressure acting on the vane control piston 221 shown in FIGS. 11a and 11b.

The VC valve is shown in FIG. 15 and includes a spool valve member 579 having five lands a, b, c, d and e. Pressure chambers 581 and 583 in the valve body are located at each end of the valve member 579. The actuation of the VC to its various positions is similar to that of the FNR valve described above. The left hand chamber 581 is continuously supplied with regulated main line pressure from conduit 516 through a calibrated inlet orifice 589, and the right hand chamber 583 is similarly supplied through a calibrated inlet orifice 591. Pressure chambers 581 and 583 have second larger outlet orifices 593 and 595 respectively that are opened and closed by a pair of valves 597 and 599 respectively. The valves 597 and 599 are actuated by armatures 598 and 600 of solenoids 601 and 603. Centering springs 613 and 617 act through washers 615 and 619 to normally hold the valve 579 centered as shown in FIG. 18.

Valve 579, in its three positions, acts to connect a vane control conduit 605 to a converter pressure conduit, to a line pressure conduit or to an exhaust port. Conduit 605 leads to the right and left side unit vane control pistons 221. The connection to different pressure levels is accomplished by establishing a connection between one of three branches 605a, 605b or 605c leading to the conduit 605 and either a main line pressure line 607, a converter pressure line 611 or an exhaust port 621. The VC valve also serves to connect whatever pressure is fed to the vane control piston to a reverse boost valve and limit valve assembly through a conduit 609. These valves and their function are described later.

FIGS. 16, 17 and 18 show the vane control valve in Low angle, Mid angle and High angle positions, respectively. These figures also show the vane control piston 221 in its corresponding positions. With both solenoids 601 and 603 de-energized, normally open valve 597 is allowed to open exhaust orifice 593 while normally closed valve 599 closes its exhaust orifice 595. This allows pressure to build up in the right chamber 583 and move the valve 579 to the left hand position as shown in FIG. 16. Here the vane control feed conduit 605 is connected to the exhaust port 621, as is the limit valve feed passage 609. With the right side of the vane control piston 221 open to exhaust, oil pressure inside the converter moves the piston and crank 219 to the position shown to place the variable vane portions 165 in their low angle corresponding to the lowest torque multiplication in the converter. The effect of the low angle will be described later.

When solenoids 601 and 603 are both energized, valve 597 closes orifice 593 and valve 599 opens orifice 595. This allows pressure to build up in chamber 581 to move the valve 579 to the right hand position shown in FIG. 17. In this position the vane control feed passage 605 and the limit valve feed are both connected to converter pressure conduit 611. With converter pressure acting on both sides of the vane control piston 221, the vanes assume an angle dependent on the oil flow over the vanes.

FIG. 18 shows the VC valve positioned for high angle representing high or maximum performance in the torque converter. This high angle position is obtained when solenoid 601 is de-energized and solenoid 603 is energized. This allows both valves 597 and 599 to be open, whereupon there is no pressure in either end chamber and the springs 613 and 617 center the valve, as shown. The valve then connects the vane control feed passage 605 to the regulated line pressure passage 607 and simultaneously connects the limit valve passage 609 to this same line pressure. Since the line pressure is always greater than the regulated converter pressure, the piston 221 will be moved by the line pressure to the position shown in FIG. 18 whereupon the variable vane portions 165 are pivoted to their high angle positions.

*Front unit downshift valve*

A two position valve 649 controlled by a single solenoid is reciprocably mounted in another bore in the valve body. This valve 649 serves to control the front unit direct drive clutch H and is designated the front unit downshift valve. The valve 649, which has three lands a, b and c, has pressure chambers at opposite ends. The left chamber has a spring 651 which urges valve 649 to the right. When the FNR valve 533 is positioned for forward drive, regulated line pressure is supplied through conduit 565 to the right hand chamber 663 where it acts to urge valve 649 to the left. This same pressure also acts through a calibrated orifice 655 in the left chamber. A second larger exhaust orifice 657 is controlled by a normally closed valve 659 actuated by spring supported armature 660 of solenoid 661.

When solenoid 661 is de-energized the valve 659 closes exhaust orifice 657, as shown in FIG. 15a, and pressure in the left chamber builds up to counterbalance the pressure in the right chamber. This allows the spring 651 to move valve 649 to the right hand position of FIG. 15a. In this position regulated line pressure from conduit 565 can pass from branch 565a between lands a and b into the front clutch apply passage 667 leading to the front unit direct drive clutch H. When solenoid 661 is energized, armature 660 opens valve 659 and because the exhaust orifice 657 is larger than orifice 655, the pressure in the left chamber will drop allowing the line pressure in the right hand chamber to move the valve to the left. This cuts off the feed passage 565a and connects the front unit direct drive clutch apply passage to an exhaust port 665 downshifting the front gear unit.

*Selector and throttle control*

As explained above, the drive control FNR valve, the vane control VC valve and the front unit downshift valve are fully controlled by solenoids. This is especially advantageous where the transmission and hydraulic controls are located at some distance from the vehicle driver since only electric wiring is needed to connect the transmission controls and the operator controls rather than mechanical or hydraulic connections. Any suitable arrangement can be used to control the solenoids. However in the example shown, the FNR valve solenoids are controlled by manual selector switches and the solenoids for the VC and downshift valves by accelerator pedal controlled switches.

FIG. 22 shows an arrangement suitable for use with the control system shown in FIGS. 15 and 15a. A conveniently located selector lever 801 can be moved by the vehicle operator to three positions corresponding to neutral, forward and reverse conditions. The lever 801 is arranged to close a switch 803 in N position and a switch 805 in R position. The vehicle battery 807, shown schematically, and the ignition switch 809 are connected to the switches 803 and 805. In neutral the switch N energizes the solenoid 555 and establishes the condition shown in FIG. 15a wherein the FNR valve is positioned for neutral drive. In the F position neither switch is closed so that neither solenoid 555 or 559 is energized with the FNR valve then being in the condition shown in FIG. 19 which establishes forward drive. In the reverse position both solenoids 555 and 559 are energized as well as solenoid 661 controlling the downshift valve. With both solenoids 555 and 559 energized the FNR valve will be conditioned as shown in FIG. 20 to establish reverse drive. Simultaneously, the downshift valve 649 is moved to its reduction ratio position whereby the front unit is conditioned for reduction drive.

A second switch operator cam 823 is controlled by some convenient throttle position responsive element such as a throttle shaft 821. The cam 823 has a lobe 825 that progressively activates three switches 827, 829 and 831 as the engine throttle is opened from its closed position to a beyond wide open throttle position. The switches 827, 829 and 831 control the solenoids 601 and 603 that in turn control the position of the vane control valve VC. Switch 831 also controls the downshift valve solenoid 661.

With the throttle closed or open less than 20° the cam 823 is positioned as shown and the three switches 827, 829 and 831 are all open. With solenoids 601 and 603 deenergized the VC valve is conditioned for low angle as shown in FIG. 16. As the cam 823 is moved into a range corresponding to a throttle opening of 20° to 75°, the switch 827 is closed to supply electric current from the battery 807 to both the vane control solenoids 601 and 603. This places the VC valve in the mid-angle condition shown in FIG. 17. As the throttle is further opened past 75° switch 827 is allowed to open and switch 829 is closed to energize only solenoid 603 and condition the VC valve for high angle, as shown in FIG. 18. Movement of the throttle beyond its wide open position allows switch 829 to open and causes switch 831 to close. This keeps the vane control solenoid 603 energized and also energizes the downshift solenoid 661 to condition the downshift valve for front unit reduction drive. Other arrangements such as push buttons, electronic controls and mechanical linkages could be used to control the solenoids.

*Limit and reverse boost valves*

Referring again to FIG. 15 it will be seen that located within a single bore in the valve body are a pair of spool valves 623 and 633 denoted as the limit valve and the reverse boost valve respectively. The limit valve 623 has a pair of lands *a* and *b* with land *a* having drilled passage 627 leading from between the lands to a pressure chamber 629. As will be more fully explained below, the limit valve 623 acts to connect a passage 520 leading to the aforementioned pressure regulator valve chamber 518 with passage 635 leading from the reverse boost valve. In forward drive the limit valve 623 limits the pressure in conduit 520 to 105 p.s.i. and in reverse drive to 155 p.s.i. as will be explained more fully below. A spring 631 is located between the limit valve 623 and the two spool reverse boost valve 633. The reverse boost valve 633 is normally held by the spring 631 in the position shown in FIG. 15 wherein it connects passage 609 leading from the vane control valve 579 to one branch 635*a* of conduit 635 leading to the limit valve. A chamber 643 at the right hand end of the valve is connected to the reverse pressure line 567 leading from the FNR valve 533. Reverse servo pressure in line 567 acts in chamber 643 to move the reverse boost valve to the left to connect the reverse pressure line 567 to a second branch 635*b* leading to the limit valve 623. The force of oil pressure in chamber 643 is also added to the force of spring 631 acting on the limit valve 623 to raise the maximum pressure in conduit 520.

*Pressure regulation control by limit and reverse boost valves*

The limit valve 623 and reverse boost valve 633 are similar to those shown and described in the co-pending application S.N. 660,157, now Patent No. 2, 912,876, entitled Transmission, filed May 20, 1957, in the name of Charles S. Chapman, Jr., and Kenneth W. Gage and assigned to the assignee of the present invention. These valves in combination with the PR valve operate to vary the main line pressure in accordance to position of the engine throttle and the FNR lever position. The vane control valve VC which, as explained above, is responsive to ranges of movement of the engine throttle control, supplies either line pressure, converter pressure to the vane control pistons through conduit 605 or it connects the same to exhaust. These pressures or exhaust are simultaneously transmitted through conduit 609 through the reverse boost valve 633 to conduit 635 and the limit valve 623 where they act in chamber 629 on the end of the valve 623. The limit valve connects the pressure in line 635 to passage 520 leading to chamber 518 of the pressure regulation valve but limits the pressure in passage 520 to a fixed value, such as 105 p.s.i. in forward drive and 155 p.s.i. in reverse drive. The main line pressure regulated by the PR valve increases with an increased pressure in chamber 518 since pressure in this chamber aids spring 511 in resisting movement of the PR valve by the regulated output pressure in chamber 508.

With the throttle opened between 0° and 20° the VC valve sets the vanes V in low angle position by connecting the vane control passage 605 to exhaust as shown in FIG. 16. Simultaneously, passage 609 is also connected to exhaust and therefore through the limit and reverse boost valves the chamber 518 in the PR valve is exhausted. The line pressure regulated by the PR valve will therefore be that maintained by the spring 511 which in the illustrated example maintains a 70 p.s.i. pressure in the system. At closed throttle or small throttle openings this pressure is sufficient to ensure that the friction elements including the neutral clutch N, the direct drive clutch H and the forward drive brake F can sustain the relatively low engine torque at these small throttle openings.

If the throttle is advanced to between 20° and 75° opening the VC valve will be actuated to the position shown in FIG. 17. Regulated converter pressure is supplied to the vane control passage 605 to condition the vanes for mid-angle and is also supplied to the limit valve passage 609. Since the converter pressure is maintained at 55 p.s.i. by the converter regulation valve 519, the limit valve will pass the full 55 p.s.i. to chamber 518. This 55 p.s.i. when added to the 70 pound effective pressure maintained by spring 511 alone will cause the PR valve to regulate the main line pressure at 55 plus 70 or 125 p.s.i. This greater pressure is needed on the friction elements to ensure sufficient load capacity to carry the increased engine torque imposed on these elements when the throttle is opened 20° to 75°.

When the throttle is further opened to more than 75° the VC valve will be conditioned as shown in FIG. 18 where it connects main line pressure to the vane control passage 605 to position the vanes V in high angle position and also connects the main line pressure to the limit valve feed line 609. Since main line pressure at this time is 125 p.s.i. the limit valve will regulate the pressure in conduit 520 and chamber 518 to a maximum of 105 p.s.i. This occurs because the pressure existing in conduit 520 and hence in chamber 629, will move the limit valve 623 against spring 631 to cut off communication between conduits 635 and 520. If the pressure in 520 is higher than 105 p.s.i., this higher pressure acting in chamber 629 will move the limit valve 623 to bleed off the excess pressure in 520 to the exhaust port 641. With a limited pressure of 105 p.s.i. in its chamber 518, the PR valve will regulate the main line pressure at 105 p.s.i. plus the normal 70 p.s.i. or a total of 175 p.s.i. The limit valve will continue to limit the pressure in chamber 518 to the 105 p.s.i. even though the line pressure in conduit 635 rises from the 125 p.s.i. to 175 p.s.i. valve. The 175 p.s.i. main line pressure will ensure that the friction devices will carry the maximum engine torque available at wide open throttle.

In reverse drive main line pressure from the FNR valve will act through conduit 567 and in chamber 643 to move the reverse boost valve 633 against spring 631 to connect the main line regulated pressure in conduit 567 to the limit valve feed passage 635. This movement of the reverse boost valve will compress spring 631 to increase its force on the limit valve 623 whereby it will maintain a maximum of 155 p.s.i. instead of the 105 p.s.i. limit in forward drive. This 155 p.s.i. acting in chamber 518 of the PR valve when added to the 70 p.s.i. effective force of the spring 511 will cause the PR valve to regulate the main line pressure at 70 plus 155 or 225 p.s.i. This higher pressure is needed to ensure that the reverse band 227 does not slip.

*Accumulator and flow rate control*

When the FNR valve 533 is positioned for forward drive, regulated main line pressure is fed through conduit 565 to both the right and left forward servos to actuate the forward drive brakes F. The feed to these servos is through a dual rate control acting in combination with an accumulator generally indicated 669. A calibrated spring 683 urges an accumulator piston 671 down into the position shown in FIG. 15. When the FNR valve is positioned for forward drive, oil in conduit 565 initially passes at a rapid rate into a forward apply passage 685 through both a restricted orifice 677 formed by pin 679 and the groove 673 formed between the lands in piston 671. Oil pressure in conduit 565 acts to hold a ball check valve 687 in the position shown where it prevents additional unrestricted flow through passage 676 to the forward apply passage 685. Oil in conduit 685 then fills the forward drive servos and moves the forward drive brake pistons 301 which act through springs 297 to engage disks 291 and 293. When the pistons 301 have stroked to provide such engagement, the pressure acting thereon will begin to build up resulting in a pressure build up on the bottom of accumulator piston 671. This causes piston 671 to stroke against spring 683 and causes the lower land 675 on piston 671 to cut off flow through the groove 673. The remainder of the forward drive application is solely through the restricted orifice 677 with the accumulator 669 controlling the pressure build up.

Upon movement of the FNR valve to neutral or reverse positions the forward apply passage 565 is connected to exhaust port 575. Since the pressure in conduit 685 at this time is greater than that in 565 the ball check valve 687 will open to allow rapid flow of oil from conduit 685 to conduit 565. It will be seen that this structure provides for a fast initial application and a slow final application with a rapid release of the forward drive friction elements.

Lubrication and cooling

The necessary oil for lubrication of the moving parts of the front, left and right side axle units is supplied by oil exiting from the left and right torque converters. This is shown schematically in FIG. 15. A pressure relief valve 645 serves to bleed off excess pressure when the oil is cold and hence flowing at a low rate through the lubrication passages. This ensures that there will be a continual fairly rapid flow of oil through the converters, such flow being necessary for proper cooling of the same.

Referring again to FIGS. 11, 11a and 11b it will be seen that converter oil at the converter static pressure of 55 p.s.i. will pass through a converter outlet passage 705 formed in the member 183 and will lubricate the one-way devices 211–213, 286–289 as well as the splines, bearings and gears of the final reduction drive unit. This oil will collect in the bottom chamber 709 formed in member 183 from where it will pass through a drain passage 711 and into the annular space 712 formed between the member 183 and the cooler cover plate 247. The cover plate 247 is secured to the case 141 by bolts 715. The space 712 has a substantial volume and oil in space 712 will be cooled by heat radiating from the cover plate 247 into an air stream created by fins 714 formed on the rotating shroud 167–169. Oil will fill the cooler space 712 and flow out at the top through a port into pipes 719b and 719c, not shown in FIGS. 11, 11a and 11b but seen in the exterior views 3, 4 and 5, as well as the schematic piping diagram shown in FIG. 14. The exterior converter and lubrication outlet pipe 719b from the left unit and pipe 719c of the right unit join near the center of the transmission. A front unit lubrication supply passage 720 connects with this joint and leads to the drilled passage 116 from which it passes into the bearing lubrication space 721 of bearing 131 and into the conduit 115 (FIGS. 8 and 9) from where it is supplied through various ports including port 117 to lubricate the various moving parts of the front unit A. The pressure relief valve 645 shown in FIG. 15 is located near the junction of converter outlet pipes 719b and 719c and serves to discharge excessive pressure directly to the center unit sump.

Scavenge pumps

Lubrication oil that collects in the right unit speedometer gear compartment, formed by the case 141, flange 275 and cover 281, is drained through an outlet, not shown, into a pipe 716b shown on the exterior view in FIG. 5 and in the schematic piping view of FIG. 14, and the similar compartment in the right unit is drained through a pipe 716c. Pipe 716b connects into the left converter outer housing 141 where drain oil from pipe 716b and oil leaking out of the converter shroud collects in a sump 723 which is connected by a suction pipe 725b to one of the three scavenge pumps $S_b$. The scavenge pump $S_b$ pumps oil from the sump 723 and discharges it back to the main sump through a common sump discharge pipe 717. The right converter housing is drained in the same manner by another scavenge pump $S_c$ through an external pipe 725c and discharged into the common discharge pipe 717. The front unit is drained through the passage 32 shown in FIG. 6 leading to the sump of the front unit and connected to the suction side of the third scavenge pump $S_a$ which pumps any oil collecting in the front unit sump into the common scavenge pump discharge line 717.

Power flow and operation

The following chart shows the condition of the solenoids as well as the brakes and clutches for each drive condition. E represents the particular solenoid energized while D represents that the solenoid is de-energized.

| Selector Lever and Throttle Positions | Solenoid Condition | | | | | Clutches and Brakes | | | |
|---|---|---|---|---|---|---|---|---|---|
| | FNR Valve | | Down-shift 661 | Vane Control | | N | F | H | R |
| | 555 | 559 | | 601 | 603 | | | | |
| Neutral | E | D | D | Same as Forward | | Off | Off | Off | Off |
| Forward: | | | | | | | | | |
|   Low Angle | D | D | D | D | D | On | On | On | Off |
|   Mid Angle | D | D | D | E | E | On | On | On | Off |
|   High Angle | D | D | D | D | E | On | On | On | Off |
| Forward-Downshift | | | E | D | E | On | On | Off | Off |
| Reverse | E | E | E | Same as Forward | | On | Off | Off | Off |

The operation of the transmission can be best seen by reference to FIG. 13 which shows a schematic top view of the combined transmission and rear axle and in which corresponding parts are numbered the same as parts shown in detail in FIGS. 6a, 6b, 11a, 11b, 11c and 11d. Referring to FIG. 13 it is seen that the power from the propeller shaft is to input shaft 1 which drives the three scavenge pumps generally denoted S and the main pump M. The input shaft 1 also drives the ring gear 35 of the front unit planetary gear set K having a sun gear 51 and planet pinions 39 mounted on the output carrier 43.

The gear set K functions as a downshift or kickdown unit. During normal forward drive the front unit direct drive clutch H is engaged and during all drive conditions except neutral the neutral clutch N is engaged. It is seen that with clutch H engaged the planet carrier 43 is connected to the sun gear 51 through the weight 55 which causes the planetary gear unit K to rotate as a single unit. The input shaft 1 and ring gear 35 therefore drive the front unit output shaft 91 through the neutral clutch N and at a one-to-one ratio. During this direct drive condition the low reaction device 61–65–67, shown schematically in FIG. 13 as a ratchet device L and which allows free rotation of the weight 55 and sun gear 51 in a forward or clockwise direction as viewed from the front of the transmission (top of FIG. 13).

Operation of the front unit K, the neutral clutches, the weight 55, etc. is fully described in the co-pending application S.N. 716,124, now Patent No. 3,062,074, in the names of Gilbert K. Hause and Oliver K. Kelley, filed February 19, 1958, entitled Multi-Phase Transmission, and assigned to the assignee of the present invention. Briefly, this unit is a balanced inertia two speed transmission with the mass 55 chosen so that its moment of inertia added to that of the sun gear 51 and associated parts multiplied by its total change in speed during a ratio change is equal to the moment of inertia of the input shaft and associated parts multiplied by their total change in speed during the same ratio change. This arrangement provides for smooth upshifts and downshifts without sudden changes in torque direction in the drive train.

If the direct drive clutch H is released, then forward drive of the ring gear 35 by the input shaft 1 in combination with a load on the carrier 43 created by the inertia of other drive elements in the power train leading to the vehicle drive wheels, will cause the sun gear 51 to be urged backward. The low freewheel reaction device L prevents such backward rotation and provides gear reaction to cause the carrier 43 to be rotated forward at reduced speed and multiplied torque. Upon re-engagement of the clutch H the front unit will again provide a direct drive one-to-one ratio. The front unit clutch H is controlled by the front unit downshift valve which in turn is controlled by the engine throttle position responsive switches and the FNR selector lever. In forward drive the clutch H is normally engaged to place the front unit in direct drive and when the engine throttle control is moved to beyond full throttle position and solenoid controlling the front unit downshift valve is energized to condition the valve for low-speed drive. This solenoid is also energized in reverse drive regardless of the throttle position.

The front unit output shaft 91 causes forward rotation of the driving bevel gear 125 which in turn causes forward or counterclockwise rotation of gear 139 as viewed from the right side of the transmission or right side of FIGURE 13. Gear 139 drives the left unit input shaft 147 and the double universal joint U which in turn through the shaft 311 drives the right axle unit input shaft 317.

Since the left and right torque converter and gear units B and C are functionally and structurally the same only operation of the left unit will be described. The exact torque multiplication of each unit may vary at any given time as where the loads and speeds of the left and right driving wheels are different. This occurs when the vehicle is turning a corner or where the traction between one wheel and the ground is different than the corresponding traction between the other wheel and the ground. In such cases the driving wheels can rotate at different speeds with the hydraulic torque converter units absorbing the difference in speeds. This speed difference will be referred to later.

Each combined torque converter and gear unit operates similarly to those shown and described in S.N. 716,124 referred to above with each unit having a plurality of automatic operational phases determined by the loads and speeds of the various elements in the combined units.

FIG. 21 schematically illustrates the vane elements in each converter.

The impeller P is forwardly rotated at engine speed when the front unit is in direct drive and is rotated at a reduced ratio when the front unit is downshifted when the clutch H is disengaged. Forward drive of the impeller P causes the oil in the converter to circulate in a forward direction and impinge in the vanes of the first runner $R_1$ to drive it in a forward direction. This effects forward rotation of connected ring gear 187 of the torque converter planetary gear unit. During forward operation the reverse band 227 is disengaged. Initially oil leaving the vanes of $R_1$ is rotating in a rearward direction and impinges on the back side of the vanes of the second runner $R_2$ to urge it rearwardly. Such backward rotation is prevented by the combination of one-way devices 215–213, 287–289 and the forward drive friction unit F.

The one-way devices 215–213 and 287–289 are schematically shown as ratchet devices in FIG. 13. With the disk brake F, comprising disks 291 and 293 engaged, the outer element 289 is held stationary from rotation in either direction and the inner element 287, shown as a spade in FIG. 13, is prevented from reverse rotation. Outer element 213 being connected to element 286 is likewise prevented from reverse rotation so that the freewheel inner element 215 and connected runner $R_2$ cannot rotate rearwardly. With $R_2$ held against reverse rotation, its vanes turn the reversely rotating oil in a forward direction so that it enters the impeller P at an advantageous angle to produce an overall torque multiplication between the input to the impeller P and the first runner $R_1$. The forward drive brake F and one-way device 287–289 also act to prevent reverse rotation of the sun gear 197 to cause the carrier 195 and sun gear 261 to rotate forward at a still lower speed than the ring gear 187 is driven.

The final reduction gear unit, including the input sun gear 261, stationary ring gear 271 and pinions 263 on carrier 267, provides a further constant ratio gear reduction corresponding to the conventional rear axle and differential gear reduction. Carrier 267 is connected to drive the left axle shaft 3b which is operatively connected to the left rear wheels. Similarly the carrier output of the right unit drives the right axle shaft 3c and right rear wheel.

*Torque converter operation*

As set forth in S.N. 716,124, referred to above, the hydraulic torque converter and its associated gear set automatically gradually changes from a hydraulic torque multiplication and gear multiplication drive to a gear multiplication drive only and finally to a substantially one-to-one ratio fluid coupling drive. As the speed of rotation of the first runner $R_1$ increases the oil leaving its vanes changes to a more forward direction until the oil acts on the vanes of $R_2$ to urge it forwardly. After reaching a speed equal to the speed of carrier 195, $R_2$ acts through the one-way device 209–210 and aids in driving the carrier 195 forwardly. During this time the one-way device 215–213 free wheels to allow forward rotation of the runner $R_2$. When $R_2$ is rotating at sufficient speed to directly drive the carrier 195 forward faster than it is being driven by the first runner $R_1$ acting through the ring gear 187, then the sun gear 197 will begin to rotate forwardly. Such forward rotation of the sun gear 197 is permitted by the one-way device 287–289. Eventually all of the torque from the input shaft 147 is transmitted to the runner $R_2$ and directly to the carrier 195 with the first runner $R_1$ rotating freely in the oil.

By varying the position of the variable exit vane portions V of the second runner $R_2$ as seen in FIG. 21 the torque converter operation can be changed from coupling phase operation to torque multiplication phase operation and back again to coupling phase. By varying the vane angle, the amount of turning done on the oil when passing between the vanes of $R_2$ can be varied. This results in changes in the amount of torque absorption by the runner $R_2$. Furthermore, the attack angle of oil entering the impeller P will be changed. The change in torque absorbed by $R_2$ and the change in forward velocity of the oil entering the impeller together act to cause a change in hydraulic torque multiplication. If the variable vane portions 165 are set in the high angle dashed line position $165_1$ of FIG. 21, the oil will be turned in an extreme forward direction for maximum torque multiplication. On the other hand if the vanes are positioned in the low angle dashed line position $165_2$ of FIG. 21 the oil will have little or no forward momentum and at higher speeds of $R_2$, the oil leaving $R_2$ will have a considerable backward rotation component.

As set forth above, the position of vane portions 165 is determined by the position of the engine throttle. With the throttle closed or opened less than 20°, both solenoid 603 and solenoid 601 will be de-energized to establish the condition shown in FIG. 16. With solenoid 601 de-energized the normally open valve 597 remains open and with solenoid 603 de-energized the normally closed valve 599 will be closed. Under this condition pressure will build up in the right chamber 583 and move the valve to the left. The vane control passage 605 will then be connected to exhaust allowing pressure in the converter to move piston 221 and crank 217 to pivot the vane elements 165 into the position $165_2$ of FIG. 21. This provides for the greatest coupling efficiency in the hydraulic unit and would be in effect during road load and coast conditions. During high angle drive the torque converter changes from a torque converter phase to a coupling phase at a relatively low speed. This provides maximum efficiency and minimum fuel consumption.

For medium performance and acceleration the throttle will be opened to between 20° and 70°, and as seen from FIG. 22 both solenoids 601 and 603 will be energized resulting in the VC valve condition shown in FIG. 17. With both solenoids 601 and 603 energized the normally open valve 597 will be closed and the normally closed valve 599 will be open. Pressure will therefore build up in the left chamber and move the VC valve to the right as shown in FIG. 17. This allows converter pressure from conduit 611 to pass between lands $b$ and $c$ into conduit 605 resulting in converter pressure acting on both sides of the vane control piston 221. The vane elements 165 are then free of the influence of piston 221 and will assume a position dependent on the speed of $R_2$ and the angle at which the oil impinges on the portions 165. If the oil leaving the main vane portions 163 of $R_2$ is moving parallel to these portions then the pivoted portions 165 will assume the full line position of FIG. 21. If the oil is flowing in a forward direction the vanes 165 will be positioned more toward the low angle position $165_1$ and if flowing reversely the vanes will assume a position more that of $165_2$. This mid-angle range of operation provides for medium performance and torque multiplication up to a relatively high speed with a relatively high coupling efficiency at higher speeds.

If the throttle is moved to a 75° to 90° open position solenoid 603 will be energized to establish the high angle condition shown in FIG. 18. Solenoid 603 will open the normally closed valve 599 and the normally open valve 597 will also be open. Without a pressure build up in either the left or right chamber the springs 613 and 617 will center the valve as shown in FIG. 18 and connect the high level main line pressure conduit 607 to the vane control passage 605 from which it will act on piston 221 and move it against the converter pressure into the position shown in FIG. 18. The pivoted vanes are then positioned as shown in the dotted line $165_1$ of FIG. 21. With the vanes in the $165_1$ position the vanes of $R_2$ will turn the oil through a greater angle and into a more forward direction with a corresponding increase in rearward torque on the runner $R_2$. If the torque converter had formerly been in a coupling phase with $R_2$ rotating forward at almost the speed of the impeller P, then the reverse torque imposed on $R_2$ due to the angle change from $165_2$ to $165_1$ will tend to urge it reversely giving a torque multiplication phase operation of the converter.

Further advancement of the accelerator pedal beyond wide open throttle position will cause the cam lobe 825 to close switch 831 keeping vane control solenoids 601 and 603 deenergized and energized respectively and at the same time energizing the kickdown solenoid 661 controlling the front unit kickdown valve 649 shown in FIG. 15a. Normally open valve 659 is thereby opened whereby the pressure on the right side will move the valve 649 against spring 651 and connect the front unit direct drive clutch apply passage 667 to the exhaust port 665. This will allow the clutch release spring 103 to release the clutch permitting the front unit gear unit to go into reduction drive. Upon movement of the throttle shaft back towards closed throttle position the solenoid 661 will again be de-energized allowing valve 659 to close and effect a build up of pressure on the left side of valve 649, whereupon it will return to the direct drive position shown in FIG. 15a.

*Reverse*

In reverse the front gear unit K is normally conditioned for reduction drive. If desired the electrical controls could be arranged to provide for direct operation in the front unit whenever the transmission is conditioned for reverse drive. However, in the preferred illustrated arrangement it is normally conditioned for reduction drive.

Referring again to the schematic representation in FIG. 13, it will be seen that engagement of the reverse band 227 holds the first runner $R_1$ from rotation as well as the ring gear 187. The vanes 161 of $R_1$ will act to turn the oil from the impeller P in a reverse direction and this reversely rotating oil will act on the vanes of $R_2$ to rotate it backward. Such backward rotation is possible because in reverse drive the forward brake F is disengaged so that no ground torque reaction is possible through the one-way devices 287–289 and 215–213. Reverse rotation of $R_2$ will cause the spade element 215 of one-way device 215–213 to drive the element 213 and connected spade element 287 reversely. This causes reverse rotation of sun gear 197 and because ring gear 187 is held by the reverse band 227, the carrier 195 is caused to rotate at a reduced speed and increased torque in a reverse direction. The one-way device 209–210 will freewheel at this time. This reverse operation which is essentially a turbo reverse is similar to that described in application S.N. 716,124, referred to above. The final reduction gear unit R will further reduce the speed and increase the torque of the reverse drive to the driving axle $3b$ and connected drive wheel.

During reverse operation the vane control is effective as in forward drive. However, it could easily be modified to set the vanes in any desired fixed position when in reverse.

*Operation of transmission units as part of vehicle suspension*

As described above, the right hand combined torque converter and gear unit C is pivotally mounted on a pivot pin 407 supported by the vehicle frame F. The left hand torque converter and gear unit B as well as the front unit A and center unit D are also pivoted on this pivot pin 407 and on the forward pivot pin 411. Pivots 407 and 411 have a common axis inclined to the horizontal centerline of the vehicle and are supported by the vehicle frame F. The double universal joint U and the sliding spline between the shaft 311 and input shaft 317, shown in FIG. 11c, allows the right unit C to pivot relative to the left unit B while providing a continuous driving connection from the front unit A to the right unit C. The flexible boot 323 acts as a dirt and moisture shield during this relative pivoting action.

FIG. 23 illustrates the pivoting action that would occur if the right wheel were to drop in a hole or depression.

Because the axis of pivots 407 and 411 is displaced from the center line of the universal joint U, the sliding spline between the stub shaft 311 and the right unit input shaft 317 is necessary to allow the left and right units to oscillate about their pivot supports. FIG. 25 illustrates the extreme position taken by the right and left units during maximum downward deflection of the sprung vehicle mass. FIG. 26 shows the ports in the extreme position taken during maximum upward deflection of the sprung vehicle mass. The suspension operation is fully set forth in the co-pending application S.N. 758,423 referred to above and reference is made to that application.

It will be seen that the invention provides for independent drive to each driving wheel with only a portion of the weight of the transmission and rear axle being dead weight on the drive wheels since most of the axle and transmission weight is on the frame supported pivot pins 407 and 411. The independent drive is accomplished with a minimum of parts since the front reduction unit serves both the right and left drive units. The transmission is fully automatic during forward drive and has no objectionable gear shifts and yet provides a wide range of gear ratios with optimum performance and efficiency at all times. The independent drive in combination with the independent rear suspension provides a true non-slip differential coincident with optimum power application to the wheels in proportion to the load and torque demand at each wheel. Thus if one wheel begins to slip during vehicle acceleration for any reason, the load imposed on the torque converter driving that wheel will decrease. This causes the torque converter and gear unit to assume a lower torque multiplication phase whereby less torque is delivered to the slipping wheel. With less driving torque the wheel slip is eliminated or greatly decreased. At the same time the other torque converter and gear unit can increase its torque multiplication to overcome the increased load on the non-slipping wheel to continue the vehicle acceleration.

When turning corners the individual torque converters can easily absorb the speed differential between the two driving wheels and still always provide an optimum torque multiplication of that engine torque to their respective driving wheels.

Other mounting arrangements could be used with the transmission and axle structure shown. For example, the pivot pins 407 and 411 could be supported by a subframe flexibly mounted on the main frame F. Such an arrangement is shown in the co-pending application S.N. 758,423 mentioned above. Other pivot arrangements than that shown could be utilized.

Other modifications and changes will be apparent to those skilled in the art and can be made within the scope of the invention which is to be limited only by the following claims.

What is claimed is:

1. In a motor vehicle an engine mounted on the vehicle, a combination transmission and dual axle unit mounted on the vehicle, said transmission and axle unit including a two speed input gear unit connected to said engine and a pair of hydraulic torque converter units arranged transversely to said input gear unit, means connecting each of said converter units to the output of said input gear unit, means for pivotally supporting said input unit and one of said converter units in the vehicle for common movement about a predetermined axis extending longitudinally of the vehicle, means pivotally supporting the other converter unit for independent movement about said predetermined axis, and an output axle shaft extending from each converter unit.

2. A combined change speed transmission and rear axle for a motor vehicle having an engine mounted near the front of the vehicle and driving a rearwardly extending propeller shaft, the combination including an input change speed gear unit having an input shaft adapted to be driven by the propeller shaft and an output shaft, a first bevel gear on said output shaft, a second bevel gear meshing with the first at a right angle thereto, an intermediate shaft driven by said second bevel gear, a first hydraulic torque transmitting unit having an input shaft driven by and coaxial with said intermediate shaft, a second hydraulic torque transmitting unit having an input shaft, a universal joint connecting said second hydraulic unit input shaft for drive by said intermediate shaft, means securing said input gear unit to one of said axle units, and means pivotally supporting the other axle unit on said one axle unit to allow rotation of said axle units relative to each other about a predetermined axis extending longitudinally of the vehicle.

3. The transmission and rear axle of claim 2 wherein said predetermined axis is non-collinear with the axis of rotation of said gear unit output shaft and said second hydraulic unit input shaft is connected to said universal joint through a sliding spline.

4. A dual output transmission having a single input shaft and a pair of oppositely extending load shafts at right angles to said input shaft, a first change speed gear unit connected to be driven by said input shaft and having an output shaft driven at a plurality of speeds relative to said input shaft, right angle gear means having an input driving member connected to and coaxial with said first gear unit output shaft and an output driven member at right angles to said first member and coaxial with one of said pair of load shafts, a second variable speed gear unit having an input shaft connected to be driven by said right angle output driven member and connected to drive said one load shaft, a third change speed gear unit having an input shaft connected by universal joint means to said output member and connected to drive the other of said load shafts, means connecting said second and third change speed gear units for relative swinging movement about a pivot axis substantially parallel to the axis of rotation of said input shaft, whereby said input shaft will drive said load shafts at a variable speed ratio and said load shafts can swing about said pivot axis extending longitudinally of the vehicle, said first speed change gear unit, said right angle gear means and said second variable speed unit being interconnected for common swinging movement about said pivot axis.

5. A combined transmission and rear axle for a motor vehicle having an engine including a first change speed gear unit adapted to be driven by an engine driven shaft, a first housing for said first change speed gear unit, a right angle gear unit, a second housing for said right angle gear unit, an output shaft extending from said first housing into said second housing and having a first bevel gear thereon forming a first portion of said right angle gear unit, a bearing for supporting said output shaft in said second housing, a second bevel gear at right angles to and meshing with the first bevel gear and forming a second portion of said right angle gear unit, a first hydraulic torque transmitting device having an input coaxial with said second bevel gear, a third housing for said first device secured to said second housing, an intermediate shaft secured to said second bevel gear and connected to drive the input of said first hydraulic device, a second hydraulic torque transmitting device, a fourth housing for said second device pivotally connected to said second housing for relative rotation thereto about a predetermined axis, a universal joint supported in said second housing connected to be driven by said intermediate shaft, an input drive shaft for said second device extending from said fourth housing into said second housing and slidably connected to said universal joint for rotation thereby, and oppositely extending output axle shafts extending from said devices out of said third and fourth housings, said first, second and third housings being interconnected for common swinging movement about said axis.

6. A combined transmission and rear axle for a motor vehicle including an input transmission unit comprising a hydraulically controlled change speed gear unit having an output shaft, a pair of combined hydraulic torque transmitting and hydraulically controlled variable speed torque multiplication axle units arranged transversely to said gear unit and each having an input shaft, one of said hydraulically controlled variable speed axle units being pivotally mounted relative to the other of said axle units, means connecting each input shaft to said output shaft for concurrent drive thereby, a common hydraulic pressure control for selectively supply controlling fluid to said gear unit and said hydraulically controlled axle units, and a plurality of hydraulic conduits connecting said control to said gear unit and axle units wherein said conduits connecting said control to said one axle unit each have a flexible portion to allow said one axle unit to pivot relative to the other axle unit.

7. A combined transmission and rear axle for a motor vehicle including an input fluid controlled change speed power transmission unit having an output shaft, a pair of combined fluid pressure torque transmitting and fluid pressure controlled variable speed and torque multiplication axle units arranged transversely to said transmission unit and each having an input shaft and an output shaft, each of said axle units being mounted for independent swinging movement about a longitudinal axis to provide generally vertical swinging movement of the output end of said final output shaft and each of said axle units being mounted closely adjacent the axis about which it swings, means connecting each input shaft to said transmission unit output shaft for concurrent drive thereby and permitting independent swinging movement of said input shafts, a common fluid pressure supply means for selectively supplying fluid to said transmission unit and said fluid controlled axle units, control means for controlling said units whereby selected speeds can be obtained, and a plurality of conduits connecting said supply means and said control means to said transmission and axle units.

8. The invention defined in claim 7 and said axle units being both mounted for swinging movement about the same longitudinal axis.

9. The invention defined in claim 7 and said input power transmission unit being a variable torque multiplication unit mounted for swinging movement with one of said axle units.

References Cited in the file of this patent

UNITED STATES PATENTS

| | | |
|---|---|---|
| 1,536,787 | Grace | May 5, 1925 |
| 2,158,557 | Lammeren | May 16, 1939 |
| 2,335,544 | Schnetzer | Nov. 30, 1943 |
| 2,353,060 | Norman | July 4, 1944 |
| 2,376,699 | Jandasek | May 22, 1945 |
| 2,381,682 | Mayner | Aug. 7, 1945 |
| 2,416,129 | Swift | Feb. 18, 1947 |
| 2,417,325 | Roos | Mar. 11, 1947 |
| 2,422,739 | Lewis | June 24, 1947 |
| 2,671,359 | Scheiter | Mar. 9, 1954 |
| 2,836,196 | Gunn | May 27, 1958 |
| 2,841,230 | Neuschaefer et al. | July 1, 1958 |
| 2,843,214 | Muller | July 15, 1958 |
| 2,854,087 | Scherenberg | Sept. 30, 1958 |
| 2,903,083 | Kelley | Sept. 8, 1959 |
| 2,912,884 | Christenson et al. | Nov. 17, 1959 |
| 2,916,929 | Neracher et al. | Dec. 15, 1959 |

FOREIGN PATENTS

| | | |
|---|---|---|
| 285,970 | Great Britain | Feb. 23, 1928 |
| 587,102 | Great Britain | Apr. 14, 1947 |